United States Patent
Masuda et al.

(10) Patent No.: US 12,179,182 B2
(45) Date of Patent: *Dec. 31, 2024

(54) METHOD FOR MAKING FUNCTIONAL STRUCTURAL BODY

(71) Applicants: NATIONAL UNIVERSITY CORPORATION HOKKAIDO UNIVERSITY, Sapporo (JP); FURUKAWA ELECTRIC CO., LTD., Tokyo (JP)

(72) Inventors: Takao Masuda, Sapporo (JP); Yuta Nakasaka, Sapporo (JP); Takuya Yoshikawa, Sapporo (JP); Sadahiro Kato, Tokyo (JP); Masayuki Fukushima, Tokyo (JP); Kojiro Inamori, Tokyo (JP); Hiroko Takahashi, Tokyo (JP); Yuichiro Banba, Tokyo (JP); Kaori Sekine, Tokyo (JP)

(73) Assignees: NATIONAL UNIVERSITY CORPORATION HOKKAIDO UNIVERSITY, Sapporo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,034

(22) Filed: Apr. 19, 2023

(65) Prior Publication Data
US 2023/0330646 A1    Oct. 19, 2023

Related U.S. Application Data

(60) Division of application No. 16/698,670, filed on Nov. 27, 2019, now Pat. No. 11,648,538, which is a
(Continued)

(30) Foreign Application Priority Data

May 31, 2017 (JP) .................... 2017-108584

(51) Int. Cl.
  B01J 29/14       (2006.01)
  B01D 53/94       (2006.01)
  (Continued)

(52) U.S. Cl.
  CPC ........... B01J 29/14 (2013.01); B01D 53/94 (2013.01); B01D 53/9409 (2013.01);
  (Continued)

(58) Field of Classification Search
  CPC ............. C10G 47/16; C10G 2300/70; B01J 35/0006; B01J 35/0013; B01J 35/04;
  (Continued)

(56) References Cited

U.S. PATENT DOCUMENTS 3,898,180 A    8/1975    Crooks et al.
4,552,855 A    11/1985   Ozin et al.
(Continued)

FOREIGN PATENT DOCUMENTS

CA    2256515 A1    12/1997
CN    1223602 A     7/1999
(Continued)

OTHER PUBLICATIONS

Narayanan et al., "Structural, morphological and catalytic investigations on hierarchical ZSM-5 zeolite hexagonal cubes by surfactant assisted hydrothermal method", Powder Technology, 274, (2015), 338-348.*
(Continued)

Primary Examiner — Smita S Patel
(74) Attorney, Agent, or Firm — Dorsey & Whitney LLP

(57) ABSTRACT

A method for making a functional structural body includes a skeletal body of a porous structure composed of a zeolite-
(Continued)

type compound, and at least one type of metallic nanoparticles present in the skeletal body, the skeletal body having channels connecting with each other, the metallic nanoparticles being present at least in the channels of the skeletal body.

5 Claims, 4 Drawing Sheets

Related U.S. Application Data continuation of application No. PCT/JP2018/021079, filed on May 31, 2018.

(51) Int. Cl.
| | |
|---|---|
| B01J 29/035 | (2006.01) |
| B01J 29/064 | (2006.01) |
| B01J 29/068 | (2006.01) |
| B01J 29/072 | (2006.01) |
| B01J 29/076 | (2006.01) |
| B01J 29/08 | (2006.01) |
| B01J 29/10 | (2006.01) |
| B01J 29/12 | (2006.01) |
| B01J 29/16 | (2006.01) |
| B01J 29/18 | (2006.01) |
| B01J 29/20 | (2006.01) |
| B01J 29/22 | (2006.01) |
| B01J 29/24 | (2006.01) |
| B01J 29/26 | (2006.01) |
| B01J 29/40 | (2006.01) |
| B01J 29/42 | (2006.01) |
| B01J 29/44 | (2006.01) |
| B01J 29/46 | (2006.01) |
| B01J 29/48 | (2006.01) |
| B01J 29/60 | (2006.01) |
| B01J 29/61 | (2006.01) |
| B01J 29/62 | (2006.01) |
| B01J 29/63 | (2006.01) |
| B01J 29/64 | (2006.01) |
| B01J 29/65 | (2006.01) |
| B01J 29/66 | (2006.01) |
| B01J 29/67 | (2006.01) |
| B01J 29/68 | (2006.01) |
| B01J 29/69 | (2006.01) |
| B01J 29/70 | (2006.01) |
| B01J 29/72 | (2006.01) |
| B01J 29/74 | (2006.01) |
| B01J 29/76 | (2006.01) |
| B01J 29/78 | (2006.01) |
| B01J 35/00 | (2006.01) |
| B01J 35/23 | (2024.01) |
| B01J 35/30 | (2024.01) |
| B01J 35/40 | (2024.01) |
| B01J 35/50 | (2024.01) |
| B01J 37/00 | (2006.01) |
| B01J 37/02 | (2006.01) |
| B01J 37/10 | (2006.01) |
| B01J 37/18 | (2006.01) |
| C01B 39/02 | (2006.01) |
| F01N 3/28 | (2006.01) |

(52) U.S. Cl.
CPC ........ *B01D 53/9413* (2013.01); *B01J 29/035* (2013.01); *B01J 29/0352* (2013.01); *B01J 29/0354* (2013.01); *B01J 29/0356* (2013.01); *B01J 29/0358* (2013.01); *B01J 29/064* (2013.01); *B01J 29/068* (2013.01); *B01J 29/072* (2013.01); *B01J 29/076* (2013.01); *B01J 29/085* (2013.01); *B01J 29/10* (2013.01); *B01J 29/12* (2013.01); *B01J 29/16* (2013.01); *B01J 29/185* (2013.01); *B01J 29/20* (2013.01); *B01J 29/22* (2013.01); *B01J 29/24* (2013.01); *B01J 29/26* (2013.01); *B01J 29/40* (2013.01); *B01J 29/405* (2013.01); *B01J 29/42* (2013.01); *B01J 29/44* (2013.01); *B01J 29/46* (2013.01); *B01J 29/48* (2013.01); *B01J 29/605* (2013.01); *B01J 29/61* (2013.01); *B01J 29/62* (2013.01); *B01J 29/63* (2013.01); *B01J 29/64* (2013.01); *B01J 29/655* (2013.01); *B01J 29/66* (2013.01); *B01J 29/67* (2013.01); *B01J 29/68* (2013.01); *B01J 29/69* (2013.01); *B01J 29/7007* (2013.01); *B01J 29/7038* (2013.01); *B01J 29/7049* (2013.01); *B01J 29/7057* (2013.01); *B01J 29/7088* (2013.01); *B01J 29/7215* (2013.01); *B01J 29/7276* (2013.01); *B01J 29/7415* (2013.01); *B01J 29/7476* (2013.01); *B01J 29/76* (2013.01); *B01J 29/7615* (2013.01); *B01J 29/7669* (2013.01); *B01J 29/7676* (2013.01); *B01J 29/7815* (2013.01); *B01J 29/7876* (2013.01); *B01J 35/19* (2024.01); *B01J 35/23* (2024.01); *B01J 35/391* (2024.01); *B01J 35/393* (2024.01); *B01J 35/394* (2024.01); *B01J 35/396* (2024.01); *B01J 35/40* (2024.01); *B01J 35/50* (2024.01); *B01J 37/0018* (2013.01); *B01J 37/0072* (2013.01); *B01J 37/0201* (2013.01); *B01J 37/0203* (2013.01); *B01J 37/0205* (2013.01); *B01J 37/0207* (2013.01); *B01J 37/0211* (2013.01); *B01J 37/0236* (2013.01); *B01J 37/10* (2013.01); *B01J 37/105* (2013.01); *B01J 37/18* (2013.01); *C01B 39/02* (2013.01); *F01N 3/2828* (2013.01); *B01D 2255/2042* (2013.01); *B01D 2255/2063* (2013.01); *B01D 2255/2073* (2013.01); *B01D 2255/2092* (2013.01); *B01D 2255/402* (2013.01); *B01D 2255/9155* (2013.01); *B01J 2229/126* (2013.01); *B01J 2229/14* (2013.01); *B01J 2229/186* (2013.01); *B01J 2229/20* (2013.01); *B01J 2229/22* (2013.01); *B01J 2229/32* (2013.01); *B01J 2229/34* (2013.01); *B01J 2229/38* (2013.01); *B01J 2229/40* (2013.01); *C10G 2300/70* (2013.01); *F01N 2330/06* (2013.01); *F01N 2370/04* (2013.01); *F01N 2510/063* (2013.01)

(58) Field of Classification Search
CPC ............... B01J 35/1057; B01J 35/1061; B01J 37/0203; B01J 37/0201; B01J 37/0207; B01J 37/0205; B01J 37/0236; B01J 37/10; B01J 37/16; B01J 37/18; B01J 37/033; B01J 37/0018; B01J 37/0072; B01J 37/0211; B01J 37/105; B01J 2229/04; B01J 2229/32; B01J 2229/34; B01J 2229/38; B01J 2229/14; B01J 2229/22; B01J 2229/126; B01J 2229/186; B01J 29/08; B01J 29/082; B01J 29/084; B01J 29/061; B01J 29/18; B01J 29/40; B01J 29/60; B01J 29/65; B01J 29/70; B01J 29/7669; B01J 29/035; B01J 29/0352; B01J 29/0354; B01J 29/0356; B01J 29/0358; B01J 29/064; B01J 29/068; B01J 29/072; B01J 29/076; B01J 29/085; B01J 29/10; B01J 29/12; B01J 29/14; B01J 29/16; B01J 29/185; B01J 29/20; B01J 29/22; B01J 29/24; B01J 29/26; B01J 29/405; B01J 29/42; B01J 29/44; B01J 29/46; B01J 29/48; B01J 29/605; B01J 29/61; B01J 29/62; B01J 29/63; B01J 29/64; B01J 29/655; B01J 29/66; B01J 29/67; B01J 29/68; B01J 29/69; B01J 29/7007; B01J 29/7415; B01J 29/7815; B01J 29/7276; B01J 29/7876; F01N 2230/06; F01N 2510/063; F01N 2370/06

USPC ........ 502/60, 63, 64, 65, 66, 69, 71, 73, 74, 502/77, 78, 79

See application file for complete search history.

(56) References Cited

U.S. PATENT DOCUMENTS

| | | |
|---|---|---|
| 5,026,673 A | 6/1991 | Gates et al. |
| 5,236,575 A | 8/1993 | Bennett et al. |
| 5,275,720 A | 1/1994 | Ward |
| 5,849,652 A | 12/1998 | Davies et al. |
| 5,994,603 A | 11/1999 | Mohr et al. |
| 6,040,259 A | 3/2000 | Mohr et al. |
| 6,831,203 B1 | 12/2004 | Mohr et al. |
| 6,881,703 B2 | 4/2005 | Cutler et al. |
| 7,074,373 B1 | 7/2006 | Warren et al. |
| 7,592,291 B2 | 9/2009 | Rollins et al. |
| 7,893,311 B2 | 2/2011 | Takamatsu et al. |
| 11,161,101 B2 | 11/2021 | Kato et al. |
| 11,547,987 B2 | 1/2023 | Masuda et al. |
| 2003/0109383 A1 | 6/2003 | Koike et al. |
| 2003/0188991 A1 | 10/2003 | Shan et al. |
| 2004/0176245 A1 | 9/2004 | Hagemeyer et al. |
| 2004/0192947 A1 | 9/2004 | Chane-Ching et al. |
| 2005/0201920 A1 | 9/2005 | Shan et al. |
| 2006/0211777 A1 | 9/2006 | Severinsky |
| 2006/0216227 A1 | 9/2006 | Idem et al. |
| 2007/0004593 A1 | 1/2007 | Ohno et al. |
| 2007/0167551 A1 | 7/2007 | Goodwin et al. |
| 2008/0045400 A1 | 2/2008 | Rollins et al. |
| 2008/0045403 A1 | 2/2008 | Rollins et al. |
| 2008/0051280 A1 | 2/2008 | Hagemeyer et al. |
| 2008/0072705 A1 | 3/2008 | Chaumonnot et al. |
| 2008/0280754 A1 | 11/2008 | Toledo et al. |
| 2008/0293990 A1 | 11/2008 | Stevenson et al. |
| 2009/0286677 A1 | 11/2009 | Takeshima et al. |
| 2009/0325790 A1 | 12/2009 | Haller et al. |
| 2010/0004118 A1 | 1/2010 | Liu et al. |
| 2011/0085944 A1 | 4/2011 | Rolllins et al. |
| 2011/0092356 A1 | 4/2011 | Rollins et al. |
| 2011/0092745 A1 | 4/2011 | Senoo et al. |
| 2011/0121238 A1 | 5/2011 | Wakatsuki |
| 2011/0293941 A1 | 12/2011 | Chaumonnot et al. |
| 2012/0042631 A1 | 2/2012 | Schmieg et al. |
| 2012/0060472 A1 | 3/2012 | Li et al. |
| 2012/0130138 A1 | 5/2012 | Yamaguchi et al. |
| 2012/0142238 A1 | 6/2012 | Saitou et al. |
| 2012/0231948 A1 | 9/2012 | Saito |
| 2013/0041174 A1 | 2/2013 | Yamamoto et al. |
| 2013/0090445 A1 | 4/2013 | Hattori et al. |
| 2013/0196158 A1 | 8/2013 | Yoshida et al. |
| 2014/0021096 A1 | 1/2014 | Chaumonnot et al. |
| 2014/0128246 A1 | 5/2014 | Garcia-Martinez |
| 2014/0147362 A1 | 5/2014 | Sasaki et al. |
| 2014/0284524 A1 | 9/2014 | Lee et al. |
| 2014/0303266 A1 | 10/2014 | Hyman |
| 2015/0018590 A1 | 1/2015 | Stevenson et al. |
| 2015/0290635 A1 | 10/2015 | Inokawa et al. |
| 2015/0367332 A1 | 12/2015 | Kuvettu et al. |
| 2016/0017238 A1 | 1/2016 | Stamires et al. |
| 2016/0023913 A1 | 1/2016 | Goel et al. |
| 2016/0024400 A1 | 1/2016 | Iwasa et al. |
| 2016/0030934 A1 | 2/2016 | Zhan et al. |
| 2016/0032202 A1 | 2/2016 | Yonemura et al. |
| 2016/0087285 A1 | 3/2016 | Watanabe et al. |
| 2016/0114314 A1 | 4/2016 | Ali et al. |
| 2016/0129429 A1 | 5/2016 | Kegnæs et al. |
| 2016/0137516 A1 * | 5/2016 | Kegnæs ................. B01J 29/044 585/467 |
| 2016/0369174 A1 | 12/2016 | Kool et al. |
| 2017/0036197 A1 | 2/2017 | Kegnæs et al. |
| 2018/0194700 A1 | 7/2018 | Pan et al. |
| 2019/0039056 A1 | 2/2019 | Kato et al. |
| 2020/0094229 A1 | 3/2020 | Masuda et al. |
| 2020/0094232 A1 | 3/2020 | Masuda et al. |
| 2020/0108374 A1 | 4/2020 | Masuda et al. |
| 2020/0108378 A1 | 4/2020 | Masuda et al. |
| 2020/0114335 A1 | 4/2020 | Masuda et al. |
| 2020/0114336 A1 | 4/2020 | Masuda et al. |
| 2020/0114337 A1 | 4/2020 | Masuda et al. |
| 2020/0114338 A1 | 4/2020 | Masuda et al. |
| 2020/0114339 A1 | 4/2020 | Masuda et al. |
| 2020/0114341 A1 | 4/2020 | Masuda et al. |
| 2020/0115248 A1 | 4/2020 | Masuda et al. |
| 2020/0115640 A1 | 4/2020 | Masuda et al. |
| 2020/0254432 A1 | 8/2020 | Shirman et al. |
| 2023/0009052 A1 | 1/2023 | Masuda et al. |
| 2023/0201814 A1 | 6/2023 | Masuda et al. |

FOREIGN PATENT DOCUMENTS

| | | |
|---|---|---|
| CN | 1720098 A | 1/2006 |
| CN | 1729138 A | 2/2006 |
| CN | 1876766 A | 12/2006 |
| CN | 101130466 A | 2/2008 |
| CN | 101180125 A | 5/2008 |
| CN | 101362959 A | 2/2009 |
| CN | 101720252 A | 6/2010 |
| CN | 101909750 A | 12/2010 |
| CN | 105377424 A | 3/2016 |
| EP | 0485180 A1 | 5/1992 |
| EP | 1709125 A1 | 10/2006 |
| IN | 102056869 A | 5/2011 |
| JP | S5746925 A | 3/1982 |
| JP | H0549943 A | 3/1993 |
| JP | H06-142456 A | 5/1994 |
| JP | H07-096195 A | 4/1995 |
| JP | H08155303 A | 6/1996 |
| JP | H1133412 A | 2/1999 |
| JP | H11151440 A | 6/1999 |
| JP | 2000197822 A | 7/2000 |
| JP | 2000511107 A | 8/2000 |
| JP | 2000323164 A | 11/2000 |
| JP | 2002255537 A | 9/2002 |
| JP | 2002336704 A | 11/2002 |
| JP | 2004528158 A | 9/2004 |
| JP | 2005170903 A | 6/2005 |
| JP | 2005189586 A | 7/2005 |
| JP | 2005270734 A | 10/2005 |
| JP | 2005314208 A | 11/2005 |
| JP | 2006021994 A | 1/2006 |
| JP | 2007130525 A | 5/2007 |
| JP | 2007519799 A | 7/2007 |
| JP | 2008012382 A | 1/2008 |
| JP | 2008542177 A | 11/2008 |
| JP | 2009505830 A | 2/2009 |
| JP | 2009255014 A | 11/2009 |
| JP | 2010501496 A | 1/2010 |
| JP | 2010099638 A | 5/2010 |
| JP | 2010527769 A | 8/2010 |
| JP | 2011517439 A | 6/2011 |
| WO | 9745197 A1 | 12/1997 |
| WO | 9745387 A1 | 12/1997 |
| WO | 2005083014 A1 | 9/2005 |
| WO | 2007000847 A1 | 1/2007 |
| WO | 2007023558 A1 | 3/2007 |
| WO | 2009096548 A1 | 8/2009 |
| WO | 2010097108 A1 | 9/2010 |

(56) References Cited

FOREIGN PATENT DOCUMENTS

| WO | 2010097224 A2 | 9/2010 |
|---|---|---|
| WO | 2011065194 A1 | 6/2011 |

OTHER PUBLICATIONS

Pernicone et al., "Catalyst Activation By Reduction", Pure & Appl. Chem., vol. 50, 1978, 1169-1191.*
Liu et al. "Cobalt nanoparticles imbedded into zeolite crystals: A tailor-made catlayst for one-step synthesis of gasoline from syngas", Internatonal Journal of Hydrogen Energy 41, (2016), 21965-21978.*
Decision of Rejection for Chinese Patent Application No. 201880035017.7 dated Aug. 1, 2023, pp. all.
Decision of Rejection for Chinese Patent Application No. 201880035525.5 dated Jun. 13, 2023, pp. all.
Notification of the Third Office Action for Chinese Patent Application No. 201880035210.0 dated Jun. 15, 2023, pp. all.
Communication pursuant to Article 94(3) EPC for European Patent Application No. 18808807.4 dated Jul. 11, 2023, pp. all.
Communication pursuant to Article 94(3) EPC for European Patent Application No. 18809577.2, dated Jul. 10, 2023, pp. all.
Decision of Rejection for Chinese Patent Application No. 201880035360.1 dated Jun. 26, 2023, pp. all.
Decision of Rejection for Chinese Patent Application No. 201880036313.9 dated Jun. 27, 2023, pp. all.
Decision of Rejection for Chinese Patent Application No. 201880035173.3 dated Sep. 1, 2023, pp. all.
Narayanan, Subramanian, et al., "Structural, morphological and catalytic investigations on hierarchical ZSM-5 zeolite hexagonal cubes by surfactant assisted hydrothermal method", Power Technology 274, 2015, pp. 338-348.
Reconsideration Report by Examiner before Appeal for Japanese Patent Application No. 2019-521318 dated Jul. 21, 2023, pp. all.
Decision of Rejection for Chinese Patent Application No. 201880035803.7 dated Aug. 10, 2023, pp. all.
Decision of Rejection for Chinese Patent Application No. 201880036312.4 dated Aug. 10, 2023, pp.all.
Decision of Rejection for the Chinese Patent Application No. 201880035026.6 dated Aug. 4, 2023, pp. all.
Extended European Search Report for EP Application No. 18809886.7, dated Jan. 29, 2021, pp. all.
[English Translation] First Office Action dated Apr. 20, 2022 for Chinese Patent Application No. 201880035803.7, pp. all.
[English Translation] First Office Action dated Jul. 11, 2022 for Chinese Patent Application No. 201880036382.X, pp. all.
[English Translation] First Office Action dated Jul. 13, 2022 for Chinese Patent Application No. 201880035026.6, pp. all.
[English Translation] First Office Action dated Jul. 5, 2022 for Chinese Patent Application No. 201880035017.7, pp. all.
[English Translation] First Office Action dated Jun. 29, 2022 for Chinese Patent Application No. 201880036388.7, pp. all.
[English Translation] First Office Action dated May 16, 2022 for Chinese Patent Application No. 201880036071.3, pp. all.
[English Translation] First Office Action dated May 5, 2022 for Chinese Patent Application No. 201880036312.4, pp. all.
[English Translation] First Office Action dated May 7, 2022 for Chinese Patent Application No. 201880035210.0, pp. all.
[English Translation] First Office Action dated on Jun. 27, 2022 for Chinese Patent Application No. 201880035525.5, pp. all.
[English Translation] First Office Action mailed on Aug. 3, 2022 for Chinese Patent Application No. 201880035569.8, bp. all.
[English Translation] First Office Action mailed on Aug. 3, 2022 for Chinese Patent Application No. 201880036313.9, pp. all.
[English Translation] Notice of Reasons for Refusal for Japanese Patent Application No. 2019-521322 dated Apr. 4, 2023, pp. all.
[English Translation] Notice of Reasons for Refusal for Japanese Patent Application No. 2019-521325 dated Apr. 4, 2023, pp. all.
[English Translation] Notice of Reasons for Refusal for Japanese Patent Application No. 2019-521325 mailed on Sep. 27, 2022, pp. all.
[English Translation] Notice of Reasons for Refusal for Japanese Patent Application No. 2019-521331 dated Apr. 4, 2023, pp. all.
[English Translation] Notice of Reasons for Refusal for Japanese Patent Application No. 2019-521334, mailed on Sep. 27, 2022, pp. all.
[English Translation] Notice of Reasons for Refusal for Japanese Patent Application No. 2019-521335, mailed Sep. 27, 2022, pp. all.
[English Translation] Notice of Reasons for Refusal for Japanese Patent Application No. JP-2019-521335 dated Apr. 4, 2023, pp. all.
[English Translation] Notice of Reasons for Refusal mailed Mar. 22, 2023 in JP Application No. 2019-521324; pp. all.
[English Translation] Notice of Reasons for Refusal mailed on Aug. 16, 2022 for Japanese Patent Application No. 2019-521324, pp. all.
[English Translation] Notice of Reasons for Refusal mailed on Aug. 3, 2022 for Japanese Patent Application No. 2019-521322, pp. all.
[English Translation] Notice of Reasons for Refusal mailed on Aug. 3, 2022 for Japanese Patent Application No. 2019-521331, pp. all.
[English Translation] Notice of Reasons for Refusal mailed on Feb. 7, 2022 for Japanese Patent Application No. 2019-521334, pp. all.
[English Translation] Notice of Reasons for Refusal mailed on Feb. 7, 2022 for Japanese Patent Application No. 2019-521335, pp. all.
[English Translation] Notice of Reasons for Refusal mailed on Feb. 7, 2022 for Japanese Patent Application No. JP2019-521325, pp. all.
[English Translation] Notice of Reasons for Refusal mailed on Jun. 28, 2022 for Japanese Patent Application No. 2019-521318, pp. all.
[English Translation] Notice of Reasons for Refusal mailed on Jun. 28, 2022 for Japanese Patent Application No. 2019-521319, pp. all.
[English Translation] Notice of Reasons for Refusal mailed on Jun. 28, 2022 for Japanese Patent Application No. 2019-521320, pp. all.
[English Translation] Notice of Reasons for Refusal mailed on Jun. 28, 2022 for Japanese Patent Application No. 2019-521321, pp. all.
[English Translation] Notice of Reasons for Refusal mailed on Jun. 6, 2022 for Japanese Patent Application No. 2019-521326, pp. all.
[English Translation] Notice of Reasons for Refusal mailed on Mar. 16, 2022 for Japanese Patent Application No. 2019-521322, pp. all.
[English Translation] Notice of Reasons for Refusal mailed on Mar. 16, 2022 for Japanese Patent Application No. 2019-521331, pp. all.
[English Translation] Notice of Reasons for Refusal mailed on Mar. 28, 2022 for Japanese Patent Application No. 2019-521324, pp. all.
[English Translation] Notice of Reasons for Refusal mailed on Sep. 27, 2022 for Japanese Patent Application No. 2019-521325, pp. all.
[English Translation] Notice of Reasons for Refusal mailed on Sep. 27, 2022 for Japanese Patent Application No. 2019-521334, pp. all.
[English Translation] Notice of Reasons for Refusal mailed on Sep. 27, 2022 for Japanese Patent Application No. 2019-521335, pp. all.
[English Translation] Saudi Arabian Office Action dated Jan. 27, 2022 for Saudi Arabian Patent Application No. 519410663, pp. all.
[English Translation] Second Office Action dated Dec. 23, 2022 in CN Application No. 201880035210.0; pp. all.
[English Translation] Second Office Action dated Jan. 5, 2023 in CN Application No. 201880035525.5; pp. all.
[English Translation] Second Office Action mailed Feb. 18, 2023 in CN Application No. 201880035173.3; pp. all.
[English Translation] Second Office Action mailed Feb. 24, 2023 in CN Application No. 201880035569.8; pp. all.
[English Translation] Second Office Action mailed Jan. 18, 2023 in CN Application No. 201880036313.9; pp. all.
[English Translation] The First Office Action dated Jul. 20, 2022 for Chinese Patent Application No. 201880035173.3, pp. all.
[English Translation] The First Office Action dated Jul. 20, 2022 for Chinese Patent Application No. 201880035360.1, pp. all.
[English Translation] Third Office Action mailed Mar. 8, 2023 for CN Application No. 201880035803.7; pp. all.
[English Translation] Third Office Action mailed Mar. 8, 2023 in CN Application No. 201880036312.4; pp. all.
[Now published as 20200114336 (A1)] U.S. Appl. No. 16/698,567, filed Nov. 27, 2019, pp. all.
[Published as US-2020-0114341-A1] U.S. Appl. No. 16/698,679 titled Functional Structural Body And Method For Making Functional Structural Body' filed Jan. 2, 2020, pp. all.

(56) References Cited

OTHER PUBLICATIONS

[Published as US-2020-0115248-A1] U.S. Appl. No. 16/698,636 titled "Functional Structural Body And Method For Making Functional Structural Body" filed Jan. 2, 2020, pp. all.

* cited by examiner

METHOD FOR MAKING FUNCTIONAL STRUCTURAL BODY

CROSS REFERENCE TO RELATED APPLICATIONS

This is a divisional application of U.S. patent application Ser. No. 16/698,670 filed on Nov. 27, 2019 and issued as U.S. Pat. No. 11,648,538 on May 16, 2023, which is a continuation application of International Patent Application No. PCT/JP2018/021079 filed May 31, 2018, which claims the benefit of Japanese Patent Application No. 2017-108584 filed May 31, 2017, and the full contents of all of which are hereby incorporated by reference in their entirety.

BACKGROUND

Technical Field

The present disclosure relates to a method for making a functional structural body having a skeletal body of a porous structure and metallic nanoparticles.

Description of the Related Art

Petrochemical raw materials called naphtha and various fuels such as heavy oil, light oil, kerosene, gasoline, and LP gas are produced from crude oil in petroleum complexes in oil manufacturers. Since the crude oil is a mixture in which various impurities are mixed in addition to the petrochemical raw materials and the various fuels described above, a step of distilling and separating the components contained in the crude oil is required.

Therefore, in the petroleum refining process, the difference in boiling point of each component is used, and crude oil is heated at a shelf stage in a column in an atmospheric pressure distillation apparatus to separate the crude oil into the components, and then the separated substances are concentrated. As a result, a low-boiling point substance such as LP gas or naphtha is removed at the upper shelf stage of the atmospheric pressure distillation apparatus while a high-boiling point substance such as heavy oil is removed from the bottom of the atmospheric pressure distillation apparatus. Then, the separated and concentrated substances are subjected to secondary processing such as desulfurization to produce various fuel products.

In general, refining catalysts have been used to efficiently modify low boiling point naphtha and the like in the above petroleum refining process to produce gasoline having a high octane number and the like. Since the naphtha fraction in the crude oil has a low octane number as it is, and is not suitable as the gasoline for vehicle operation, by modifying the paraffins and naphthenes having a low octane number in the naphtha fraction to an aromatic fractions having a high octane number using refining catalysts, reformed gasoline having characteristics suitable for vehicle fuel is produced.

In addition, as crude oil becomes heavier, hydrocracking treatment is performed in which heavy oil is hydrodesulfurized using a hydrodesulfurization apparatus such as a direct desulfurization apparatus, an indirect desulfurization apparatus, and the like to obtain desulfurized heavy oil, desulfurized heavy gas oil, and the like that are further decomposed to increase production of desulfurized naphtha, desulfurized kerosene, desulfurized light oil, and the like. For example, by hydrocracking the atmospheric pressure distilled residual oil, the yields of the desulfurized light gas distillate and the desulfurized naphtha fraction are increased and the desulfurized heavy oil is decreased, and the LPG fraction, FCC gasoline fraction, and LCO fraction are produced from the desulfurized heavy oil in the catalytic cracking device, and thereby the residual oil is decreased and the distillate of light oil is increased. In this case, a catalyst including a crystalline aluminosilicate support, which is an exemplary zeolite, and a hydrocracking catalyst containing specific proportions of zeolite and a porous inorganic oxide have been proposed.

For example, a catalyst is disclosed in which a metal made from a material selected from Pd, Pt, Co, Fe, Cr, Mo, W and mixtures thereof is deposited on the surface of a support including Y type zeolite as a hydrocracking catalyst (US 2016/0030934).

Furthermore, in the automotive field, as a catalyst structural body for exhaust emissions of automotive equipped with a diesel engine, a ceramic catalyst body is proposed in which a ceramic support is disposed on a ceramic surface of a substrate, and both a main catalyst component and a co-catalyst component are supported on the ceramic support. In this ceramic catalyst body, a large number of pores formed from lattice defects and the like in the crystal lattice are formed in the surface of a ceramic support made of $\gamma$-alumina, and a main catalyst component including Ce—Zr, Pt, and the like is directly supported near the surface of the ceramic support (US 2003/0109383).

However, in the catalyst structural body described above, because the catalyst particles are supported on or near the surfaces of the supports, the catalyst particles move within the supports due to the effects of the force, heat, and the like of fluid such as a material to be modified during the modification process, and the aggregation of the catalyst particles (sintering) easily occurs. When aggregation of catalyst particles occurs, the catalytic activity decreases due to the reduction in effective surface area as a catalyst, and therefore the life time of the catalyst becomes shorter than normal. Therefore, the catalyst structural body itself must be replaced or regenerated over a short period of time, which leads to the problem that the replacement operation is cumbersome and resource saving cannot be achieved. Furthermore, since refining catalysts are typically connected to the downstream side of the atmospheric pressure distillation apparatus and are used continuously in a petroleum refining process, it is difficult to apply the catalyst reactivation technique, and even if the reactivation technique can be applied, the work is very complicated.

SUMMARY

The present disclosure is related to providing a method for making a functional structural body that can realize a long life time by suppressing the decline in function and that can fulfill resource saving without requiring a complicated replacement operation.

The present inventors have found and completed the disclosure based on such a finding that the functional structural body that can suppress the decline in function of metallic nanoparticles and that can realize a long life time is obtained by including: a skeletal body of a porous structure composed of a zeolite-type compound and at least one type of metallic nanoparticles present in the skeletal body, wherein the skeletal body has channels connecting with each other, and the metallic nanoparticles are held on at least in the channels of the skeletal body.

Namely, the main configurations of the present disclosure are as follows.

{1} A method for making a functional structural body, including:

a calcination step of calcinating a precursor material (B) obtained by impregnating a precursor material (A) for obtaining a skeletal body of a porous structure composed of a zeolite-type compound with a metal containing solution;

a hydrothermal treatment step of hydrothermally treating a precursor material (C) obtained by calcinating the precursor material (B); and a step of subjecting the hydrothermally treated precursor material (C) to a reduction treatment.

{2} The method for making a functional structural body according to {1}, wherein 50 to 500 mass % of a non-ionic surfactant is added to the precursor material (A) prior to the calcination step.

{3} The method for making a functional structural body according to [1] or {2}, wherein the precursor material (A) is impregnated with the metal containing solution by adding the metal containing solution to the precursor material (A) in multiple portions prior to the calcination step.

{4} The method for making a functional structural body according to any one of {1} to {3}, wherein in impregnating the precursor material (A) with the metal containing solution prior to the calcination step, the amount of the metal containing solution added to the precursor material (A) is adjusted to 10 to 1000 in terms of the ratio of silicon (Si) constituting the precursor material (A) to the metal element (M) included in the metal containing solution added to the precursor material (A) (ratio of number of atoms Si/M).

{5} The method for making a functional structural body according to {1}, wherein in the hydrothermal treatment step, the precursor material (C) and a structure directing agent are mixed.

{6} The method for making a functional structural body according to {1}, wherein the hydrothermal treatment step is performed in a basic condition.

The present disclosure provides a method for making a functional structural body that can realize a long life time by suppressing the decline in function and that can fulfill resource saving without requiring a complicated replacement operation.

BRIEF DESCRIPTION OF DRAWINGS

FIG. 1A is a perspective view (partially shown in cross-section), and FIG. 1B is a partially enlarged cross-sectional view.

FIG. 2A is a diagram illustrating the function of a sieve, and FIG. 2B is a diagram explaining the catalytic function.

DETAILED DESCRIPTION

Hereinafter, embodiments of the present disclosure will be described in detail with reference to drawings.

[Configuration of Functional Structural Body]

Figure 1A:
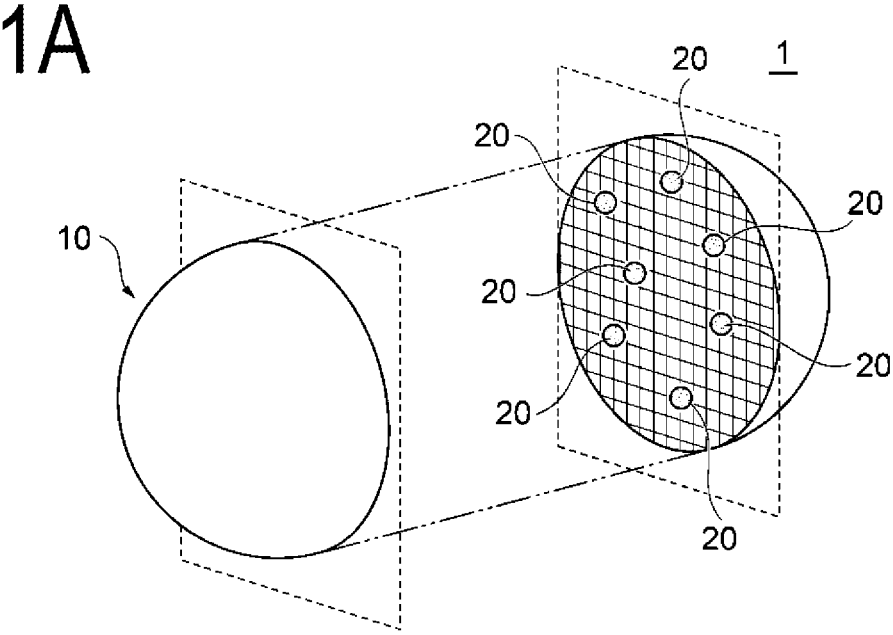
FIGS. 1A and 1B are diagrams schematically illustrating a functional structural body according to an embodiment of the present disclosure so that the inner structure can be understood.
Figure 1B:
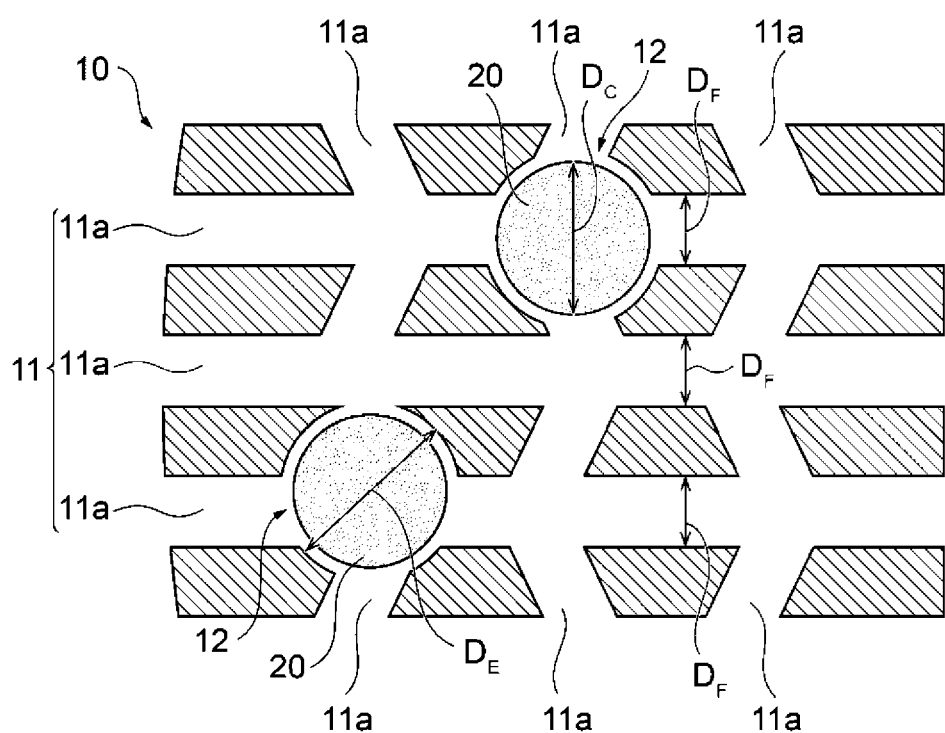

FIGS. 1A AND 1B is a diagram schematically illustrating a configuration of a functional structural body according to an embodiment of the present disclosure. FIG. 1A is a perspective view (partially shown in cross-section), and FIG. 1B is a partially enlarged cross-sectional view. Note that the functional structural body in FIG. 1 is an example of the functional structural body, and the shape, dimension, and the like of each of the configurations according to the present disclosure are not limited to those illustrated in FIG. 1.

As shown in FIG. 1A, a functional structural body 1 includes a skeletal body 10 of a porous structure composed of a zeolite-type compound, and at least one type of metallic nanoparticles 20 present in the skeletal body 10.

This metallic nanoparticle 20 is a substance that exhibits one or more functions by itself, or in cooperation with the skeletal body 10. Specific examples of the function described above include catalytic function, light emission (or fluorescent) function, light-absorbing function, and identification function. The metallic nanoparticles 20 are preferably, for example, a catalytic substance having a catalytic function. When the metallic nanoparticles 20 are a catalytic substance, the skeletal body 10 is a support that supports the catalytic substance.

In the functional structural body 1, a plurality of types of metallic nanoparticles 20, 20, . . . are embedded in the porous structure of the skeletal body 10. The catalytic substance as an example of the metallic nanoparticles 20 is preferably metallic nanoparticles. The metallic nanoparticles are described in detail below. Furthermore, the metallic nanoparticles 20 may be particles including a metal oxide, a metal alloy, or their composites.

The skeletal body 10 is a porous structure, and as illustrated in FIG. 1B, a plurality of pores 11a, 11a, . . . are preferably formed so as to have channels 11 connecting with each other. Here, the metallic nanoparticles 20 are present at least in the channel 11 of the skeletal body 10, and are preferably held at least in the channel 11 of the skeletal body 10.

With such a configuration, movement of the metallic nanoparticles 20 within the skeletal body 10 is restricted, and aggregation between the metallic nanoparticles 20 and 20 is effectively prevented. As a result, the decrease in effective surface area of the metallic nanoparticles 20 can be effectively suppressed, and the function of the metallic nanoparticles 20 lasts for a long period of time. In other words, according to the functional structural body 1, the decline in function due to aggregation of the metallic nanoparticles 20 can be suppressed, and the long life time of the functional structural body 1 can be extended. In addition, due to the long life time of the functional structural body 1, the replacement frequency of the functional structural body 1 can be reduced, and the amount of waste of the used functional structural body 1 can be significantly reduced, and thereby can save resources.

Typically, when the functional structural body is used in a fluid (e.g., a heavy oil, or reformed gas such as NOx, etc.), it can be subjected to external forces from the fluid. In this case, if the metallic nanoparticles are only held in an attached state to the outer surface of the skeletal body 10, there is a problem in that they are easy to detach from the outer surface of the skeletal body 10 due to the effect of external force from the fluid. In contrast, in the functional structural body 1, the metallic nanoparticles 20 are held at least in the channels 11 of the skeletal body 10, and therefore, even if subjected to an external force caused by the fluid, the metallic nanoparticles 20 are less likely to detach from the skeletal body 10. That is, when the functional structural body 1 is in the fluid, the fluid flows into the channel 11 from the pore 11a of the skeletal body 10, so that the speed of the fluid flowing through the channel 11 is slower than the speed of the fluid flowing on the outer surface of the skeletal body 10 due to the flow path resistance (frictional force). Due to the effect of such flow path resistance, the pressure received by the metallic nanoparticles 20 held in the channel 11 from the fluid is lower than the pressure received by the metallic nanoparticles from the fluid outside of the skeletal body 10. As a result, detachment of the metallic nanoparticles 20 present in the skeletal body 11 can be effectively suppressed, and the function of the metallic nanoparticles 20 can be stably maintained over a long period of time. Note that the flow path resistance as described above is thought to be larger as the channel 11 of the skeletal body 10 has a plurality of bends and branches, and the interior of the skeletal body 10 becomes a more complex three-dimensional structure.

Preferably, the channel 11 has any one of a one-dimensional pore, a two-dimensional pore, and a three-dimensional pore defined by the framework of a zeolite-type compound and an enlarged pore portion 12 which has a diameter different from any one of the one-dimensional pore, the two-dimensional pore, and the three-dimensional pore. In this case, the metallic nanoparticles 20 are preferably present at least in the enlarged pore portion 12. More preferably, the metallic nanoparticles 20 are embedded at least in the enlarged pore portion 12. Here, the "one-dimensional pore" refers to a tunnel-shaped or cage-shaped pore forming a one-dimensional channel, or a plurality of tunnel-shaped or cage-shaped pores (a plurality of one-dimensional channels) forming a plurality of one-dimensional channels. Also, the "two-dimensional pore" refers to a two-dimensional channel in which a plurality of one-dimensional channels are connected two-dimensionally. The "three-dimensional pore" refers to a three-dimensional channel in which a plurality of one-dimensional channels are connected three-dimensionally.

As a result, movement of the metallic nanoparticles 20 within the skeletal body 10 is further restricted, whereby detachment of the metallic nanoparticles 20 and aggregation between the metallic nanoparticles 20, 20 are effectively prevented. The term "embedding" refers to a state in which the metallic nanoparticles 20 are capsuled inside the skeletal body 10. At this time, the metallic nanoparticles 20 and the skeletal body 10 need not necessarily be in direct contact with each other, but the metallic nanoparticles 20 may be indirectly held by the skeletal body 10 with other substances (e.g., a surfactant, etc.) interposed between the metallic nanoparticles 20 and the skeletal body 10.

Although FIG. 1B illustrates the case in which the metallic nanoparticles 20 are embedded in the enlarged pore portion 12, the metallic nanoparticles 20 are not limited to this configuration only, and the metallic nanoparticles 20 may be present in the channel 11 with a portion thereof protruding outward of the enlarged pore portion 12. Furthermore, the metallic nanoparticles 20 may be partially embedded in a portion of the channel 11 other than the enlarged pore portion 12 (for example, an inner wall portion of the channel 11), or may be held by fixing, for example.

Additionally, the enlarged pore portion 12 preferably connects with the plurality of pores 11a, 11a constituting any one of the one-dimensional pore, the two-dimensional pore, and the three-dimensional pore. As a result, a separate channel different from the one-dimensional pore, the two-dimensional pore, or the three-dimensional pore is provided in the interior of the skeletal body 10, so that the function of the metallic nanoparticles 20 can be further exhibited.

Additionally, the channel 11 is formed three-dimensionally by including a branch portion or a merging portion in the interior of the skeletal body 10, and the enlarged pore portion 12 is preferably provided in the branch portion or the merging portion of the channel 11.

The average inner diameter $D_F$ of the channel 11 formed in the skeletal body 10 is calculated from the average value of the short diameter and the long diameter of the pore 11a constituting any one of the one-dimensional pore, the two-dimensional pore, and the three-dimensional pore. For example, it is from 0.1 nm to 1.5 nm, and preferably from 0.5 nm to 0.8 nm. The inner diameter $D_E$ of the enlarged pore portion 12 is for example from 0.5 nm to 50 nm, preferably from 1.1 nm to 40 nm, and more preferably from 1.1 nm to 3.3 nm. For example, the inner diameter $D_E$ of the enlarged pore portion 12 depends on the pore diameter of the precursor material (A) described below and the average particle size $D_C$ of the metallic nanoparticles 20 to be embedded. The inner diameter $D_E$ of the enlarged pore portion 12 is sized so that the enlarged pore portion 12 is able to embed the metallic nanoparticles 20.

The skeletal body 10 is composed of a zeolite-type compound. Examples of zeolite-type compounds include zeolite analog compounds such as zeolites (alminosilicate salts), cation exchanged zeolites, silicate compounds such as silicalite, alminoborate salts, alminoarsenate salts, and germanate salts; and phosphate-based zeolite analog materials such as molybdenum phosphate. Among these, the zeolite-type compound is preferably a silicate compound.

The framework of the zeolite-type compound is selected from FAU type (Y type or X type), MTW type, MFI type (ZSM-5), FER type (ferrierite), LTA type (A type), MWW type (MCM-22), MOR type (mordenite), LTL type (L type), and BEA type (beta type). Preferably, it is MFI type, and more preferably ZSM-5. A plurality of pores having a pore diameter corresponding to each framework are formed in the zeolite-type compound. For example, the maximum pore diameter of MFI type is 0.636 nm (6.36 Å) and the average pore diameter is 0.560 nm (5.60 Å).

Hereinafter, a case in which the metallic nanoparticles 20 are metallic nanoparticles will be described in detail.

The metallic nanoparticles 20 may be primary particles or secondary particles formed by aggregation of primary particles, but the average particle size $D_C$ of the metallic nanoparticles 20 is preferably larger than the average inner diameter $D_F$ of the channel 11 and not greater than the inner diameter $D_E$ of the enlarged pore portion 12 ($D_F<D_C\leq D_E$). Such metallic nanoparticles 20 are suitably embedded in the enlarged pore portion 12 within the channel 11, and the movement of the nanoparticles 20 within the skeletal body 10 is restricted. Thus, even if the metallic nanoparticles 20 are subjected to an external force from the fluid, movement of the metallic nanoparticles 20 within the skeletal body 10 is suppressed, thereby effectively preventing contact and aggregation between the metallic nanoparticles 20, 20, . . . embedded in the enlarged pore portions 12, 12, . . . dispersed in the channel 11 of the skeletal body 10.

In addition, whether the metallic nanoparticles 20 are primary or secondary particles, the average particle size $D_C$ of the metallic nanoparticles 20 is preferably from 0.08 nm to 30 nm, more preferably 0.08 nm or higher and less than 25 nm, and further preferably from 0.4 nm to 11.0 nm, and particularly preferably from 0.8 nm to 2.7 nm. Furthermore, the ratio ($D_C/D_F$) of the average particle size $D_C$ of the metallic nanoparticles 20 to the average inner diameter $D_F$ of the channel 11 is preferably from 0.05 to 300, more preferably from 0.1 to 30, even more preferably from 1.1 to 30, and particularly preferably from 1.4 to 3.6.

When the functional substance 20 is a metallic nanoparticle, the metal element (M) of the metallic nanoparticles is preferably contained in 0.5 to 2.5 mass % relative to the functional structural body 1, and more preferably from 0.5 to 1.5 mass % relative to the functional structural body 1. For example, when the metal element (M) is Co, the content of Co element (mass %) is expressed as {(mass of Co element)/(mass of all elements of the functional structural body 1)}×100.

The metallic nanoparticles only need to be constituted by a metal that is not oxidized, and may be constituted by a single metal or a mixture of two or more types of metals, for example. Note that in the present specification, the "metal" constituting the metallic nanoparticles (as the raw material) refers to an elemental metal containing one type of metal element (M) and a metal alloy containing two or more types of metal elements (M), and the term is a generic term for a metal containing one or more metal elements (M).

Examples of such a metal include platinum (Pt), palladium (Pd), ruthenium (Ru), nickel (Ni), cobalt (Co), molybdenum (Mo), tungsten (W), iron (Fe), chromium (Cr), cerium (Ce), copper (Cu), magnesium (Mg), and aluminum (Al). Preferably, any one of metals described above is the major component.

Furthermore, the ratio of silicon (Si) constituting the skeletal body 10 to the metal element (M) constituting the metallic nanoparticles 20 (the ratio of number of atoms Si/M) is preferably from 10 to 1000, and more preferably from 50 to 200. If the ratio is greater than 1000, the metallic nanoparticles may have a low activity for example, and the effect thereof may not be sufficiently obtained. On the other hand, if the ratio is smaller than 10, the proportion of the metallic nanoparticles 20 becomes too large, and the strength of the skeletal body 10 tends to decrease. Note that the metallic nanoparticles 20 described here, which are present in the interior of the skeletal body 10 or are supported, do not include metallic nanoparticles adhered to the outer surface of the skeletal body 10.

[Function of Functional Structural Body]

The functional structural body 1 includes the skeletal body 10 of a porous structure and at least one type of metallic nanoparticles 20 present in the skeletal body, as described above. The functional structural body 1 exhibits a function depending on the function of the metallic nanoparticles 20 upon contact of the metallic nanoparticles 20 present in the skeletal body with a fluid. In particular, the fluid in contact with the outer surface 10a of the functional structural body 1 flows into the skeletal body 10 through the pore 11a formed in the outer surface 10a and guided into the channel 11, moves through the channel 11, and exits to the exterior of the functional structural body 1 through the other pore 11a. In the pathway through which the fluid travels through the channel 11, contacting with the metallic nanoparticles 20 held in the channel 11 results in a reaction (e.g., a catalytic reaction) depending on the function of the metallic nanoparticles 20. In addition, the functional structural body 1 has molecule sieving capability due to a porous structure of the skeletal body.

Figure 2A:
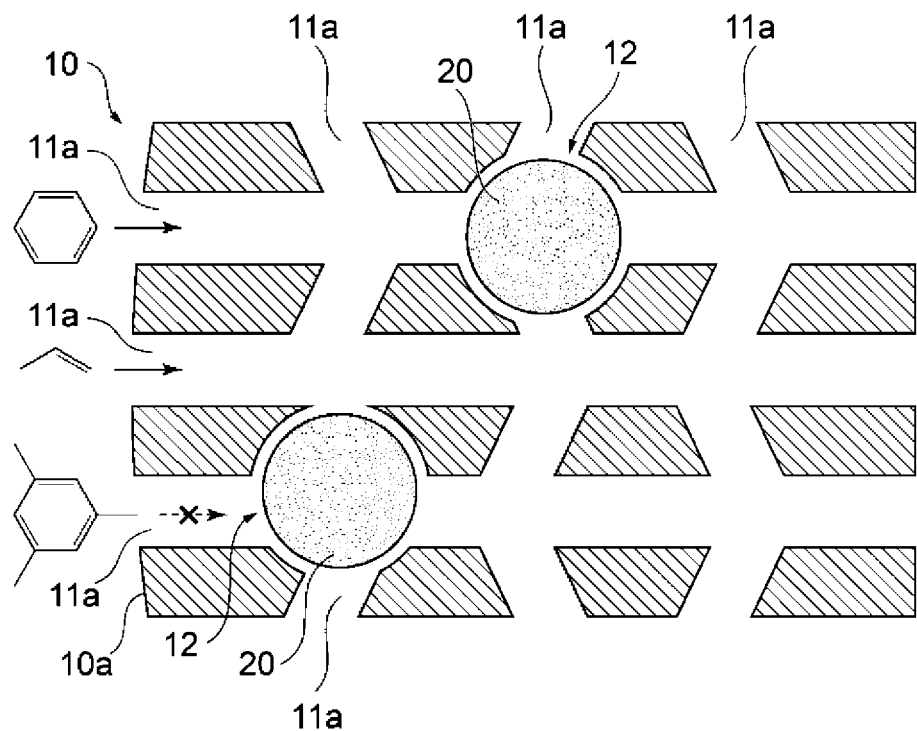
FIGS. 2A and 2B are partial enlarged cross-sectional views for explaining an example of the function of the functional structural body of FIGS. 1A and 1B.

The functional structural body 1 has a molecule sieving capability that screens intended molecules contained in a heavy oil such as a residue oil. Specifically, as shown in FIG. 2A, molecules having a size less than or equal to the inner diameter of the hole 11a formed in the outer surface 10a of the skeletal body 10 can enter into the skeletal body 10, and molecules having a size greater than the inner diameter of the pore 11a are restricted from entering into the skeletal body 10. This molecule sieving capability allows preferential reaction of the intended molecules capable of entering into the pore 11a.

In addition, through the above-described reaction, of the molecules generated in the pore 11a by the reaction described above, only the molecules that can exit from the pore 11a to the outside of the skeletal body 10 are obtained as a product, and the molecules that cannot exit from the pore 11a to the outside of the skeletal body 10 are converted to molecules having such a size that they can exit from the pore 11a, and then exit from the pore 11a to the outside of the skeletal body 10. As a result, the product obtained by the catalytic reaction can be limited to intended molecules.

Figure 2B:
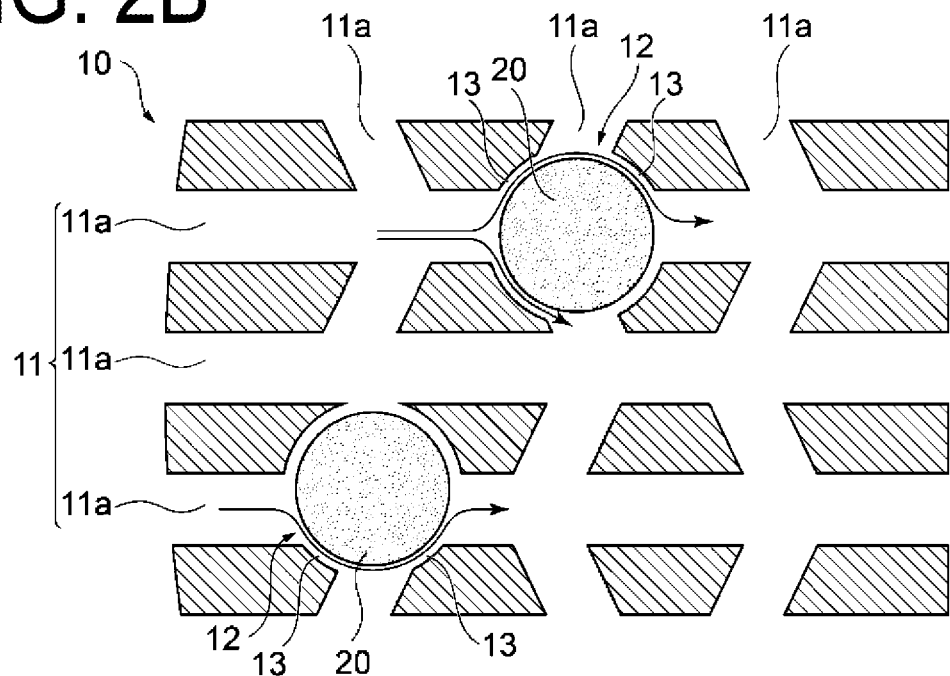

In the functional structural body 1, the metallic nanoparticles 20 are suitably embedded in the enlarged pore portion 12 of the channel 11. Thus, the molecules that have entered into the pore 11a, or the channel 11 come into contact with the metallic nanoparticles 20. When the primary average particle size $D_C$ of the metallic nanoparticles 20 is larger than the average inner diameter $D_F$ of the channel 11 and smaller than the inner diameter $D_E$ of the enlarged pore portion 12 ($D_F<D_C<D_E$), a small channel 13 is formed between the metallic nanoparticles 20 and the enlarged pore portion 12 (FIG. 2B), and the molecules that have entered into the small channel 13 come into contact with the metallic nanoparticles 20. At this time, the metallic nanoparticles 20 is embedded in the enlarged pore portion 12, thereby restricting the movement thereof, so that their contact area with the fluid containing the molecules that have entered into the channel 11 is maintained.

When the molecules that have entered into the channel 11 come into contact with the metallic nanoparticles 20, the molecules (substance to be modified) are modified by the oxidative decomposition reaction of the metallic nanoparticles 20. For example, when ruthenium contained in the metallic nanoparticles 20 is used as a catalyst, ammonia is oxidatively decomposed to generate nitrogen and hydrogen. By performing the oxidative decomposition treatment using a metal catalyst in this manner, the hydrogen used in the hydrocracking process in the related art becomes unnecessary, and heavy components, which have not been sufficiently utilized in terms of local limitations and costs of hydrogen supply, can be modified into light oils. The substance to be treated is not limited to the intended molecules contained in a heavy oil, and may be intended molecules contained in other raw oils such as naphtha, kerosene, and light oil.

Because the metallic nanoparticles 20 are a non-oxidized metal, when the fluid is at a high temperature, the metallic nanoparticles 20 can diffuse due to heat received from the fluid and finely divided by diffusion, and can be detached from the enlarged pore portion 12. However, the phenomenon in which small metallic nanoparticles having a small particle size of approximately 5 nm diffuse in the form of smaller metallic nanoparticles is unstable, and high activation energy is required for the progress of the diffusion, thus the above-described diffusion is difficult to proceed. In addition, even if diffusion has progressed, the metallic nanoparticles 20 become finely divided, thus the effective surface area as a catalyst after diffusion increases compared to before diffusion. In addition, although the channel 11 is described in a simplified form in FIG. 1B, the channel 11 actually has a three-dimensional complex structure due to the inclusion of the metallic nanoparticles 20 inside, and thus the movement of metal atoms along the inner wall surface of the channel 11 is likely restricted to an extent to suppress aggregation (sintering) caused by the movement of metal atoms. Furthermore, even when the metallic nanoparticles 20 are detached from the enlarged pore portion 12, the retention time of the metallic nanoparticles in the skeletal body 10 is likely prolonged by the above-described structure of the channel 11. Therefore, the embedding of the metallic nanoparticles 20 in the enlarged pore portion 12 allows the catalytic function to be exhibited over a long period of time.

[Method for Making Functional Structural Body]

Figure 3:
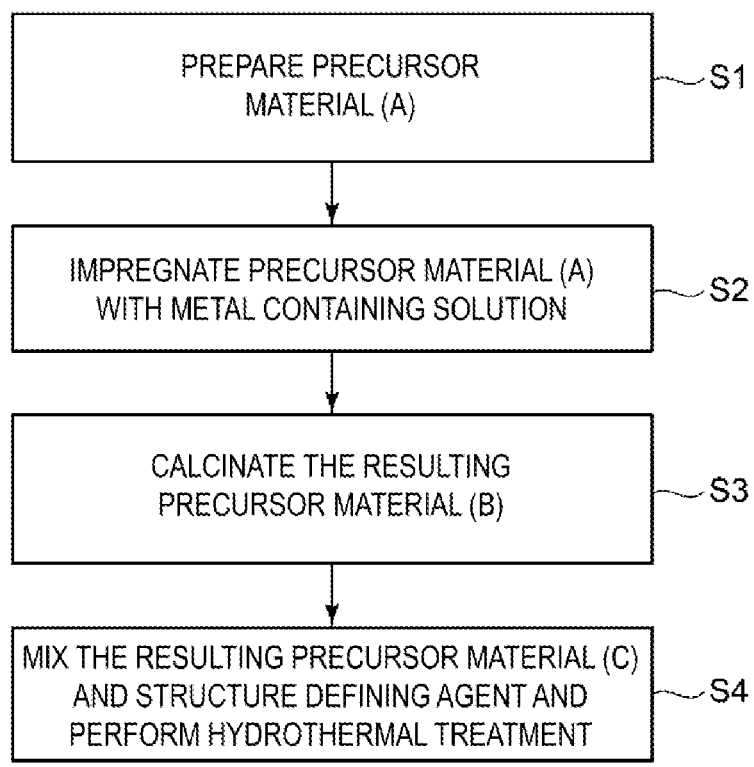
FIG. 3 is a flowchart illustrating an example of a method for making the functional structural body of FIGS. 1A AND 1B.

FIG. 3 is a flowchart illustrating a method for making the functional structural body 1 of FIGS. 1A and 1B. An example of the method for making the functional structural body will be described below using, as an example, the case in which the metallic nanoparticles are present in the skeletal body.

(Step S1: Preparation Step)

As shown in FIG. 3, the precursor material (A) is first prepared for obtaining the skeletal body of the porous structure composed of the zeolite-type compound. The precursor material (A) is preferably a regular mesopore material, and can be appropriately selected according to the type (composition) of the zeolite-type compound constituting the skeletal body of the functional structural body.

Here, when the zeolite-type compound constituting the skeletal body of the functional structural body is a silicate compound, the regular mesopore material is preferably a compound including a Si—O skeleton in which pores having a pore diameter of 1 to 50 nm are uniformly sized and regularly developed one-dimensionally, two-dimension-ally, or three-dimensionally. While such a regular mesopore material is obtained as a variety of synthetic materials depending on the synthetic conditions. Specific examples of the synthetic material include SBA-1, SBA-15, SBA-16, KIT-6, FSM-16, and MCM-41. Among them, MCM-41 is preferred. Note that the pore diameter of SBA-1 is from 10 to 30 nm, the pore diameter of SBA-15 is from 6 to 10 nm, the pore diameter of SBA-16 is 6 nm, the pore diameter of KIT-6 is 9 nm, the pore diameter of FSM-16 is from 3 to 5 nm, and the pore diameter of MCM-41 is from 1 to 10 nm. Examples of such a regular mesopore material include mesoporous silica, mesoporous aluminosilicate, and mesoporous metallosilicate.

The precursor material (A) may be a commercially available product or a synthetic product. When the precursor material (A) is synthesized, it can be synthesized by a known method for synthesizing a regular mesopore material. For example, a mixed solution including a raw material containing the constituent elements of the precursor material (A) and a molding agent for defining the structure of the precursor material (A) is prepared, and the pH is adjusted as necessary to perform hydrothermal treatment (hydrothermal synthesis). Thereafter, the precipitate (product) obtained by hydrothermal treatment is collected (e.g., filtered), washed and dried as necessary, and then calcinated to obtain a precursor material (A) which is a powdered regular mesopore material. Here, examples of the solvent of the mixed solution that can be used include water, an organic solvent such as alcohol, or a mixed solvent thereof. In addition, the raw material is selected according to the type of the skeletal body, but examples thereof include silica agents such as tetraethoxysilane (TEOS), fumed silica, and quartz sand. In addition, various types of surfactants, block copolymers, and the like can be used as the molding agent, and it is preferably selected depending on the type of the synthetic materials of the regular mesopore material. For example, a surfactant such as hexadecyltrimethylammonium bromide is preferable for producing MCM-41. The hydrothermal treatment can be performed at 0 to 2,000 kPa at 80 to 800° C. for 5 hours to 240 hours in a sealed container. For example, the calcination treatment can be performed in air, at 350 to 850° C. for 2 hours to 30 hours.

(Step S2: Impregnating Step)

The prepared precursor material (A) is then impregnated with the metal containing solution to obtain the precursor material (B).

The metal containing solution is a solution containing a metal component (for example, a metal ion) corresponding to the metal element (M) constituting the metallic nanoparticles of the functional structural body, and can be prepared, for example, by dissolving a metal salt containing the metal element (M) in a solvent. Examples of such metal salts include metal salts such as chlorides, hydroxides, oxides, sulfates, and nitrates. Of these, nitrates are preferable. Examples of the solvent that can be used include water, an organic solvent such as alcohol, or a mixed solvent thereof.

The method for impregnating the precursor material (A) with the metal containing solution is not particularly limited; however, for example, the metal containing solution is preferably added in portions several times under stirring the powdered precursor material (A) before the calcination step described below. In addition, the surfactant is preferably added to the precursor material (A) as an additive to the precursor material (A) before adding the metal containing solution, from the perspective of allowing the metal containing solution to enter the pores of the precursor material (A) more easily. It is believed that such additives serve to cover the outer surface of the precursor material (A) and inhibit the subsequently added metal containing solution from adhering to the outer surface of the precursor material (A), making it easier for the metal containing solution to enter the pores of the precursor material (A).

Examples of such additives include non-ionic surfactants such as polyoxyethylene oleyl ether, polyoxyethylene alkyl ether, and polyoxyethylene alkylphenyl ether. It is believed that these surfactants do not adhere to the interior of the pores because their molecular size is large and cannot enter the pores of the precursor material (A), and will not interfere with the penetration of the metal containing solution into the pores. As the method for adding the non-ionic surfactant, for example, it is preferable to add from 50 to 500 mass % of the non-ionic surfactant relative to the precursor material (A) prior to the calcination step described below. If the added amount of the non-ionic surfactant is less than 50 mass % relative to the precursor material (A), the aforementioned suppressing effect is not easily exhibited, and when more than 500 mass % of the non-ionic surfactant relative to the precursor material (A) is added, the viscosity is too high, which is not preferable. Thus, the added amount of the non-ionic surfactant relative to the precursor material (A) is a value within the range described above.

Furthermore, the added amount of the metal containing solution added to the precursor material (A) is preferably adjusted as appropriate in consideration of the amount of the metal element (M) contained in the metal containing solution with which the precursor material (A) is impregnated (that is, the amount of the metal element (M) present in the precursor material (B)). For example, prior to the calcination step described below, the added amount of the metal containing solution added to the precursor material (A), in terms of a ratio of silicon (Si) constituting the precursor material (A) to a metal element (M) included in the metal containing solution added to the precursor material (A) (the ratio of number of atoms Si/M), is preferably adjusted to 10 to 1000, and more preferably 50 to 200. For example, if a surfactant as an additive is added to the precursor material (A) prior to adding the metal containing solution to the precursor material (A), the content of the metal element (M) of the metallic nanoparticles in the functional structural body 1 can be adjusted to 0.5 to 2.5 mass % by adding the metal containing solution to the precursor material (A) in an amount of 50 to 200 in terms of the ratio of number of atoms Si/M. In the state of the precursor material (B), the amount of the metal element (M) present within the pores is generally proportional to the added amount of the metal containing solution added to the precursor material (A) if the metal concentration of the metal containing solution, the presence or absence of additives, and other conditions such as temperature, pressure, and the like are the same. Additionally, the amount of the metal element (M) present in the precursor material (B) is in a proportional relation to the amount of the metal element constituting the metallic nanoparticles present in the skeletal body of the functional structural body. Thus, by controlling the amount of the metal containing solution added to the precursor material (A) to the range described above, the pores of the precursor material (A) can be sufficiently impregnated with the metal containing solution, and thus the amount of the metallic nanoparticles present in the skeletal body of the functional structural body can be adjusted.

After impregnating the precursor material (A) with the metal containing solution, a washing treatment may be performed as necessary. Examples of the washing solution that can be used include water, an organic solvent such as alcohol, or a mixed solvent thereof. Furthermore, the precursor material (A) is preferably impregnated with the metal containing solution, and after the washing treatment is performed as necessary, the precursor material (A) is further subjected to drying treatment. Drying treatments include overnight natural drying and high temperature drying at 150° C. or lower. Note that when calcination treatment described below is performed in the state in which a large amount of moisture contained in the metal containing solution and the wash solution remains in the precursor material (A), the skeletal structure as the regular mesopore material of the precursor material (A) may be broken, and thus it is preferable to dry them sufficiently.

(Step S3: Calcination Step)

Next, a precursor material (C) is obtained by calcinating the precursor material (B) obtained by impregnating the precursor material (A) for obtaining the skeletal body of the porous structure composed of a zeolite-type compound with the metal containing solution.

For example, the calcination treatment is preferably performed in air, at 350 to 850° C. for 2 hours to 30 hours. Through this calcination treatment, the metal component that has entered into the pores of the regular mesopore material undergoes crystal growth, and metallic nanoparticles are formed in the pores.

(Step S4: Hydrothermal Treatment Step)

A mixed solution of the precursor material (C) and a structure directing agent is then prepared, and the precursor material (C) obtained by calcinating the precursor material (B) is hydrothermally treated to obtain a functional structural body.

The structure directing agent is a molding agent for defining the framework of the skeletal body of the functional structural body, for example the surfactant can be used. The structure directing agent is preferably selected according to the framework of the skeletal body of the functional structural body, and for example, a surfactant such as tetramethylammonium bromide (TMABr), tetraethylammonium bromide (TEABr), and tetrapropylammonium bromide (TPABr) are suitable.

The mixing of the precursor material (C) and the structure directing agent may be performed during the hydrothermal treatment step or may be performed before the hydrothermal treatment step. Furthermore, the method for preparing the mixed solution is not particularly limited, and the precursor material (C), the structure directing agent, and the solvent may be mixed simultaneously, or the respective dispersion solutions may be mixed after the precursor material (C) and the structure directing agent are each dispersed in the solvent to form a solution. Examples of the solvent that can be used include water, an organic solvent such as alcohol, or a mixed solvent thereof. In addition, it is preferable that the pH of the mixed solution is adjusted using an acid or a base prior to performing the hydrothermal treatment.

The hydrothermal treatment can be performed by a known method. For example, the hydrothermal treatment can be preferably performed at 0 to 2,000 kPa at 80 to 800° C. for 5 hours to 240 hours in a sealed container. Furthermore, the hydrothermal treatment is preferably performed under a basic condition.

Although the reaction mechanism here is not necessarily clear, by performing hydrothermal treatment using the precursor material (C) as a raw material, the skeletal structure as the regular mesopore material of the precursor material (C) becomes gradually disrupted. However, under the action of the structure directing agent, a new framework (porous structure) is formed as the skeletal body of the functional structural body while substantially maintaining the position of the metallic nanoparticles within the pores of the precursor material (C). The functional structural body obtained in this way includes the skeletal body having the porous structure and metallic nanoparticles present in the skeletal body, and the skeletal body has a channel in which a plurality of pores connect with each other by the porous structure, and at least a portion of the metallic nanoparticles are present in the channel of the skeletal body.

Furthermore, in the present embodiment, in the hydrothermal treatment step, a mixed solution in which the precursor material (C) and the structure directing agent are mixed is prepared, and the precursor material (C) is subjected to hydrothermal treatment, which is not a limitation. The precursor material (C) may be subjected to hydrothermal treatment without mixing the precursor material (C) and the structure directing agent.

The precipitate obtained after hydrothermal treatment (functional structural body) is preferably washed, dried, and calcinated as necessary after being collected (e.g., filtered). Examples of the washing solution that can be used include water, an organic solvent such as alcohol, or a mixed solution thereof. Drying treatments include overnight natural drying and high temperature drying at 150° C. or lower. Note that when calcination treatment is performed in the state in which there is a large amount of moisture remaining in the precipitate, the framework as a skeletal body of the functional structural body may be broken, and thus it is preferable to dry the precipitate sufficiently. For example, the calcination treatment can be performed in air, at 350 to 850° C. for 2 hours to 30 hours. Such calcination treatment burns out the structure directing agent that has been attached to the functional structural body. Furthermore, the functional structural body can be used as is without subjecting the collected precipitate to calcination treatment, depending on the intended use. For example, if the environment in which the functional structural body is used is a high temperature environment of an oxidizing atmosphere, exposing the functional structural body to a usage environment for a period of time allows the structure directing agent to be burned out and to obtain a functional structural body similar to that when subjected to calcination treatment. Thus, the obtained functional structural body can be used as is.

The making method described above is an example in which the metal element (M) contained in the metal containing solution that impregnates the precursor material (A) is a metal species (e.g., a noble metal) that is hard to be oxidized.

When the metal element (M) contained in the metal containing solution that impregnates the precursor material (A) is an easily oxidized metal species (e.g., Fe, Co, or Cu), the hydrothermally treated precursor material (C) after the hydrothermal treatment step is preferably subjected to reduction treatment. When the metal element (M) contained in the metal containing solution is an easily oxidized metal species, the metal component can be oxidized by the heat treatment in the steps (steps S3 to S4) after the impregnating treatment (step S2). Therefore, metal oxide nanoparticles are present in the skeletal body formed in the hydrothermal treatment step (step S4). Therefore, in order to obtain a functional structural body in which metallic nanoparticles are present in its skeletal body, it is preferred that the collected precipitate be calcinated after the hydrothermal treatment, and further subjected to reduction treatment in a reducing gas atmosphere such as hydrogen gas (step S5: reduction treatment step). Through the reduction treatment, the metallic nanoparticles present in the skeletal body are reduced to form metallic nanoparticles that correspond to the metal element (M) constituting the metal oxide nanoparticles. As a result, a functional structural body in which metallic nanoparticles are present in its skeletal body is obtained. The reduction treatment may be performed as necessary. For example, if the environment in which the functional structural body is used is a reducing atmosphere, the metallic nanoparticles are reduced by exposing the functional structural body to a usage environment for a period of time, so that a functional structural body similar to that obtained when subjected to reduction treatment is obtained. Thus, the obtained functional structural body can be used as is in the form including oxide nanoparticles in the skeletal body.

[Modified Example of Functional Structural Body 1]

Figure 4:
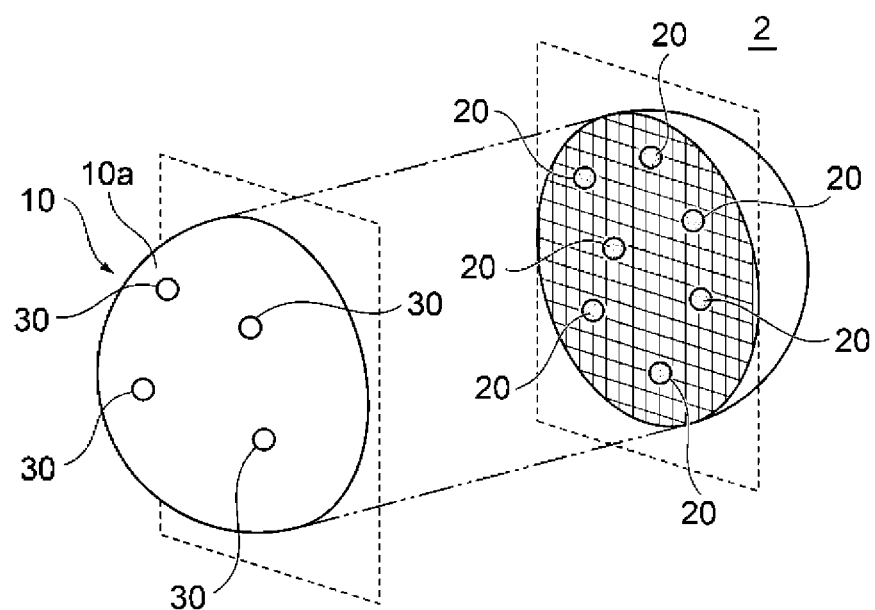
FIG. 4 is a schematic view illustrating a modified example of the functional structural body of FIGS. 1A AND 1B.

FIG. 4 is a schematic view illustrating a modified example of the functional structural body 1 in FIGS. 1A and 1B.

Although the functional structural body 1 of FIGS. 1A and 1B illustrates the case in which it includes the skeletal body 10 and the metallic nanoparticles 20 present in the skeletal body 10, the functional structural body is not limited to this configuration. For example, as illustrated in FIG. 4, the functional structural body 2 may further include at least one type of metallic nanoparticles 30 held on the outer surface 10a of the skeletal body 10.

This metallic nanoparticles 30 is a substance that exhibits one or more functions. The function of the metallic nanoparticles 30 may be the same as or different from the function of the metallic nanoparticles 20. A specific example of the function of the metallic nanoparticles 30 is the same as that described for the metallic nanoparticles 20, and preferably has a catalytic function, and in this case the metallic nanoparticles 30 are a catalytic substance. Also, if both of the metallic nanoparticles 20 and 30 are materials having the same function, the material of the other metallic nanoparticles 30 may be the same as or different from the material of the metallic nanoparticles 20. According to this configuration, the content of the metallic nanoparticles held in the functional structural body 2 can be increased, and the functions of the metallic nanoparticles can be further exhibited.

In this case, the content of the metallic nanoparticles 20 present in the skeletal body 10 is preferably greater than that of the other metallic nanoparticles 30 held on the outer surface 10a of the skeletal body 10. As a result, the function of the metallic nanoparticles 20 held inside the skeletal body 10 becomes dominant, whereby the function of the metallic nanoparticles is stably exhibited.

Hereinbefore, the functional structural body according to the embodiments of the disclosure has been described, but the present disclosure is not limited to the above embodiments, and various modifications and changes are possible on the basis of the technical concept of the present disclosure.

EXAMPLES

Example 1 to 384

[Synthesis of Precursor Material (A)]

A mixed aqueous solution was prepared by mixing a silica agent (tetraethoxysilane (TEOS), available from Wako Pure Chemical Industries, Ltd.) and a surfactant as a molding agent. The pH was adjusted as appropriate, and hydrothermal treatment was performed at 80 to 350° C. for 100 hours in a sealed container. Thereafter, the produced precipitate was filtered out, washed with water and ethanol, and then calcinated in air at 600° C. for 24 hours to obtain the precursor material (A) having the type and the pore diameter shown in Tables 1 to 8. Note that the following surfactant was used depending on the type of the precursor material (A) ("the type of precursor material (A): surfactant").

MCM-41: Hexadecyltrimethylammonium bromide (CTAB) (available from Wako Pure Chemical Industries, Ltd.)

SBA-1: Pluronic P123 (available from BASF)

[Fabrication of Precursor Material (B) and (C)]

Next, a metal containing aqueous solution was prepared by dissolving a metal salt containing the metal element (M) in water according to the metal element (M) constituting the metallic nanoparticles of the type shown in Tables 1 to 8. Following metal salts were used in accordance with the type of metallic nanoparticles ("metallic nanoparticles: metal salt").

Co: cobalt nitrate (II) hexahydrate (available from Wako Pure Chemical Industries, Ltd.)

Ni: nickel nitrate (II) hexahydrate (available from Wako Pure Chemical Industries, Ltd.)

Fe: Iron nitrate (III) nonahydrate (available from Wako Pure Chemical Industries, Ltd.)

Cu: Copper nitrate (II) trihydrate (available from Wako Pure Chemical Industries, Ltd.)

Next, a metal containing solution was added to the powdered precursor material (A) in portions, and dried at room temperature (20° C.±10° C.) for 12 hours or longer to obtain the precursor material (B).

Note that when the presence or absence of additives shown in Tables 1 to 8 is "yes", pretreatment in which an aqueous solution of polyoxyethylene (15) oleyl ether (NIK-KOL BO-15 V, available from Nikko Chemicals Co., Ltd.) is added as the additive to the precursor material (A) prior to adding the metal containing aqueous solution, and then the aqueous solution containing a metal was added as described above. Note that when "no" is used in the presence or absence of an additive, pretreatment with an additive such as that described above has not been performed.

Furthermore, the added amount of the metal containing aqueous solution added to the precursor material (A) was adjusted such that the value obtained by converting it to a ratio of silicon (Si) constituting the precursor material (A) to a metal element (M) included in the metal containing solution (the ratio of number of atoms of Si/M) is in Tables 1 to 8.

Next, the precursor material (B) impregnated with the metal containing aqueous solution obtained as described above was calcinated in air at 600° C. for 24 hours to obtain the precursor material (C).

The precursor material (C) obtained as described above and the structure directing agent shown in Tables 1 to 8 were mixed to produce a mixed aqueous solution. Hydrothermal treatment was performed under the conditions of at 80 to 350° C., at pH and time shown in Tables 1 to 8 in a sealed container. Thereafter, the produced precipitate was filtered out, washed with water, dried at 100° C. for 12 hours or longer, and then calcinated in air at 600° C. for 24 hours. The calcinated product was then collected and subjected to reduction treatment under purging hydrogen gas at 400° C. for 350 minutes to obtain functional structural bodies containing a skeletal body and metallic nanoparticles shown in Tables 1 to 8 (Examples 1 to 384).

Comparative Example 1

In Comparative Example 1, cobalt oxide powder (II, III) having an average particle size of 50 nm or less (available from Sigma-Aldrich Japan LLC) was mixed with MFI type silicalite, subjected to hydrogen reduction treatment in the similar manner as in Examples, thereby obtaining a functional structural body in which cobalt oxide nanoparticles were attached as the functional substance to the outer surface of the silicalite as the skeletal body. MFI type silicalite was synthesized in the similar manner as in Examples 52 to 57 except for a step of adding a metal.

Comparative Example 2

In Comparative Example 2, MFI type silicalite was synthesized in the similar manner as in Comparative Example 1 except that the step of attaching the cobalt oxide nanoparticles was omitted.

[Evaluation]

Various characteristic evaluations were performed on the functional structural bodies of the above examples and the silicalite of the comparative examples under the conditions described below.

[A] Cross Sectional Observation

The functional structural bodies of the examples and the silicalite of the comparative examples were pulverized to make observation samples, and their cross sections were observed using a transmission electron microscope (TEM) (TITAN G2, available from FEI).

As a result, it was confirmed that, in the functional structural body of the examples described above, metallic nanoparticles were included and held in the skeletal body made of silicalite or zeolite. On the other hand, in the silicalite of Comparative Example 1, the metallic nanoparticles were only attached to the outer surface of the skeletal body and were not present in the skeletal body.

In addition, of the examples described above, the functional structural body including iron nanoparticles (Fe) capsuled therein as the metal was cut out to obtain a cross section by focused ion beam (FIB) processing, and cross-sectional elemental analysis was performed using SEM (SU8020, available from Hitachi High-Technologies Corporation) and EDX (X-Max, available from Horiba, Ltd.). As a result, elements Fe were detected inside the skeletal body.

From the results of the cross-sectional observation using TEM and SEM/EDX, the presence of iron nanoparticles in the skeletal body was confirmed.

[B] Average Inner Diameter of the Channel of the Skeletal Body and Average Particle Size of the Metallic Nanoparticles In the TEM image taken by the cross-sectional observation performed in evaluation [A] above, 500 channels of the skeletal body were randomly selected, and the respective major diameter and the minor diameter were measured, and the respective inner diameters were calculated from the average values (N=500), and the average value of the inner diameter was designated as the average inner diameter $D_F$ of the channel of the skeletal body. In addition, in the same manner for the metallic nanoparticles, 500 metallic nanoparticles were randomly selected from the TEM image, and the respective particle sizes were measured (N=500), and the average value thereof was designated as the average particle size $D_C$ of the metallic nanoparticles. The results are shown in Tables 1 to 8.

Also, SAXS (small angle X-ray scattering) was used to analyze the average particle size and dispersion status of the functional substance. Measurements by SAXS were performed using a Spring-8 beam line BL19B2. The obtained SAXS data was fitted with a spherical model using the Guinier approximation method, and the particle size was calculated. The particle size was measured for the functional structural body in which the metal was iron nanoparticles. Furthermore, as a comparative reference, commercially available iron nanoparticles (available from Wako) was observed and measured on SEM.

As a result, in the commercial product, various sizes of iron nanoparticles were randomly present in a range of particle sizes of approximately 50 nm to 400 nm, whereas in the measurement results of SAXS, scattering peaks with particle sizes of 10 nm or less were also detected for the functional structural bodies of Examples having an average particle size of 1.2 nm to 2.0 nm as determined from the TEM image. From the results of SAXS measurement and the SEM/EDX cross-sectional measurement, it was found that functional substances having a particle size of 10 nm or less are present in the skeletal body in a very highly dispersed state with a uniform particle sizes.

[C] Relationship Between the Added Amount of the Metal Containing Solution and the Amount of Metal Embedded in the Skeletal Body A functional structural body in which metallic nanoparticles were embedded in the skeletal body at an added amount in terms of the ratio of number of atoms of Si/M=50, 100, 200, 1000 (M=Co, Ni, Fe, Cu) was produced, and then the amount of metal (mass %) that was embedded in the skeletal body of the functional structural body made at the above added amount was measured. Note that in the present measurement, a functional structural body with the ratio of number of atoms Si/M=100, 200, 1000 is produced by adjusting the added amount of the metal containing solution in the same manner as the functional structural body of the ratio of number of atoms Si/M=100, 200, 1000 in Examples 1 to 384, and functional structural bodies with the ratio of number of atoms Si/M=50 were made in the same manner as the functional structural body with the ratio of number of atoms Si/M=100, 200, 1000, except that the added amount of the metal containing solution was different.

The amount of metal was quantified by ICP (radiofrequency inductively coupled plasma) alone or in combination with ICP and XRF (fluorescence X-ray analysis). XRF (energy dispersive fluorescent x-ray analyzer "SEA1200VX", available from SSI Nanotechnology) was performed under conditions of a vacuum atmosphere, an accelerating voltage of 15 kV (using a Cr filter), or an accelerating voltage of 50 kV (using a Pb filter).

XRF is a method for calculating the amount of metal present in terms of fluorescence intensity, and XRF alone cannot calculate a quantitative value (in terms of mass %). Therefore, the metal content of the functional structural body to which the metal was added at Si/M=100 was determined by ICP analysis, and the metal content of the functional structural body in which the metal was added at Si/M=50 and less than 100 was calculated based on XRF measurement results and ICP measurement results.

As a result, it was confirmed that the amount of metal embedded in the functional structural body increases as the added amount of the metal containing solution increases, and was at least within a range that the ratio of numbers of atoms is within 50 to 1000.

[D] Performance Evaluation

The catalytic ability (performance) of the metallic nanoparticles (catalytic substance) was evaluated for the functional structural bodies of the examples described above and the silicalite of the comparative examples. The results are shown in Tables 1 to 8.

(1) Catalytic Activity

The catalytic activity was evaluated under the following conditions:

First, 0.2 g of the functional structural body was charged in a normal pressure flow reactor, and a decomposition reaction of butylbenzene (model material for heavy oil) was performed with nitrogen gas ($N_2$) as a carrier gas (5 ml/min) at 400° C. for 2 hours.

After completion of the reaction, the generated gas and the generated liquid that were collected were analyzed by gas chromatography (GC) and gas chromatography mass spectrometry (GC/MS) for the composition. Note that, as the analysis device, TRACE 1310 GC (available from Thermo Fisher Scientific Inc., detector: thermal conductivity detector, flame ionization detector), and TRACE DSQ (Thermo Fischer Scientific Inc., detector: mass detector, ionization method: EI (ion source temperature 250° C., MS transfer line temperature of 320° C.)) were used.

Furthermore, based on the results of the composition analysis described above, the yield (mol %) of a compound having a molecular weight lower than that of butylbenzene (specifically, benzene, toluene, ethylbenzene, styrene, cumene, methane, ethane, ethylene, propane, propylene, butane, butene, and the like) was determined. The yield of the compound was calculated as the percentage (mol %) of the total amount (mol) of the amount of substance of the compound having a lower molecular weight than the butylbenzene contained in the production liquid (mol %) relative to the amount of substance (mol) of butylbenzene prior to the reaction.

In the present example, when the yield of a compound having a molecular weight lower than that of butylbenzene contained in the product liquid is 40 mol % or more, it is determined that the catalytic activity (capacity of decomposition) is excellent, and considered as "A". When it is 25 mol % or more and less than 40 mol %, it is determined that the catalytic activity is good, and considered as "B". When it is 10 mol % or more and less than 25 mol %, it is determined that the catalytic activity is not good, but is pass level (acceptable), and considered as "C". When it is less than 10 mol %, it is determined that the catalytic activity is poor (not pass), and considered as "D".

(2) Durability (Life Time)

The durability was evaluated under the following conditions:

First, the functional structural body used in evaluation (1) above was collected and heated at 650° C. for 12 hours to produce a functional structural body after heating. Next, a decomposition reaction of butylbenzene (model material of heavy oil) was performed by the similar method as in evaluation (1) above using the obtained functional structural body after heating, and composition analysis of the generated gas and the generated liquid was performed in the similar manner as in the above evaluation (1).

Based on the obtained analytical results, the yield (mol %) of a compound having a molecular weight lower than that of butylbenzene was determined in the similar manner as in evaluation (1) above. Furthermore, the yield of the above compound by the functional structural body after heating was compared with the yield of the above compound by the functional structural body prior to heating (the yield determined in evaluation (1) above) to determine the degree of maintenance. Specifically, the percentage (%) of the yield of the compound obtained by the functional structural body after heating (yield determined by the present evaluation (2) above) to the yield of the above compound by the functional structural body prior to heating (yield determined by the evaluation (1) above) was calculated.

In the present embodiment, when the yield of the compound (yield determined by the present evaluation (2)) of the above compound obtained by the functional structural body after heating (yield determined by the present evaluation (2)) is maintained at least 80% compared to the yield of the compound obtained by the functional structural body prior to heating (yield determined by evaluation (1) above), it is determined that the durability (heat resistance) is excellent, and considered as "A". When it is maintained 60% or more and less than 80%, it is determined that the durability (heat resistance) is good, and considered as "B". When it is maintained 40% or more and less than 60%, it is determined that the durability (heat resistance) is not good, but is pass level (acceptable), and considered as "C". When it is reduced below 40%, it is determined that the durability (heat resistance) is poor (not pass), and considered as "D".

Performance evaluations similar to those of evaluation (1) and (2) above were also performed on Comparative Examples 1 and 2. Note that Comparative Example 2 contains the skeletal body only, but do not contain the functional substance. Therefore, in the performance evaluation described above, only the skeletal body of Comparative Example 2 was charged in place of the functional structural body. The results are shown in Table 8.

TABLE 1

Making Conditions for Functional Structural Body

| | Precursor Material (A) | | Addition to Precursor Material (A) | | Hydrothermal Treatment Conditions for Precursor Material (C) | | | Functional Structural Body | | | | | Performance Evaluation | |
|---|---|---|---|---|---|---|---|---|---|---|---|---|---|---|
| | | | Presence or Absence of Additives | Conversion Ratio (ratio of number of atoms) Si/M of Added Amount of Metal Containing Solution | | | | Skeletal body Zeolite-Type Compound | | Functional Substance Metallic Nanoparticles | | | | |
| No. | Type | Pore Diameter (nm) | | | Type of Structure Directing agent | pH | Time (h) | Framework | Average Inner Diameter $D_F$ of Channels (nm) | Type | Average Particle Size $D_C$ (nm) | $D_C/D_F$ | Catalytic Activity | Durability |
| Example 1 | MCM-41 | 1.3 | Yes | 1000 | TEABr | 12 | 120 | FAU | 0.74 | Co | 0.11 | 0.1 | C | C |
| Example 2 | | | | 500 | | | | | 0.74 | | 0.32 | 0.4 | C | C |
| Example 3 | | | | 200 | | | | | 0.74 | | 0.53 | 0.7 | B | C |
| Example 4 | | | | 100 | | | | | 0.74 | | 1.06 | 1.4 | A | B |
| Example 5 | | 2.0 | | | | | | | 0.74 | | 1.59 | 2.1 | A | B |
| Example 6 | | 2.4 | | | | | | | 0.74 | | 1.90 | 2.6 | A | A |
| Example 7 | | 2.6 | | | | | | | 0.74 | | 2.11 | 2.9 | A | A |
| Example 8 | | 3.3 | | | | | | | 0.74 | | 2.64 | 3.6 | A | A |
| Example 9 | | 6.6 | | | | | | | 0.74 | | 5.29 | 7.1 | B | A |
| Example 10 | SBA-1 | 13.2 | | | | | | | 0.74 | | 10.57 | 14.3 | B | A |
| Example 11 | | 19.8 | | | | | | | 0.74 | | 15.86 | 21.4 | C | A |
| Example 12 | | 26.4 | | | | | | | 0.74 | | 21.14 | 28.6 | C | A |
| Example 13 | MCM-41 | 1.3 | None | 1000 | | | | | 0.74 | | 0.11 | 0.1 | C | C |
| Example 14 | | | | 500 | | | | | 0.74 | | 0.32 | 0.4 | C | C |
| Example 15 | | | | 200 | | | | | 0.74 | | 0.53 | 0.7 | B | C |
| Example 16 | | | | 100 | | | | | 0.74 | | 1.06 | 1.4 | A | B |
| Example 17 | | 2.0 | | | | | | | 0.74 | | 1.59 | 2.1 | A | B |
| Example 18 | | 2.4 | | | | | | | 0.74 | | 1.90 | 2.6 | B | A |
| Example 19 | | 2.6 | | | | | | | 0.74 | | 2.11 | 2.9 | B | A |
| Example 20 | | 3.3 | | | | | | | 0.74 | | 2.64 | 3.6 | B | A |
| Example 21 | | 6.6 | | | | | | | 0.74 | | 5.29 | 7.1 | C | A |
| Example 22 | SBA-1 | 13.2 | | | | | | | 0.74 | | 10.57 | 14.3 | C | A |
| Example 23 | | 19.8 | | | | | | | 0.74 | | 15.86 | 21.4 | C | A |
| Example 24 | | 26.4 | | | | | | | 0.74 | | 21.14 | 28.6 | C | A |
| Example 25 | MCM-41 | 1.1 | Yes | 1000 | | 11 | 72 | MTW | 0.61 | | 0.09 | 0.1 | C | C |
| Example 26 | | | | 500 | | | | | 0.61 | | 0.26 | 0.4 | C | C |
| Example 27 | | | | 200 | | | | | 0.61 | | 0.44 | 0.7 | B | C |
| Example 28 | | | | 100 | | | | | 0.61 | | 0.87 | 1.4 | A | B |
| Example 29 | | 1.6 | | | | | | | 0.61 | | 1.31 | 2.1 | A | B |
| Example 30 | | 2.0 | | | | | | | 0.61 | | 1.57 | 2.6 | A | B |
| Example 31 | | 2.2 | | | | | | | 0.61 | | 1.74 | 2.9 | A | A |
| Example 32 | | 2.7 | | | | | | | 0.61 | | 2.18 | 3.6 | A | A |
| Example 33 | | 5.4 | | | | | | | 0.61 | | 4.36 | 7.1 | B | A |
| Example 34 | SBA-1 | 10.9 | | | | | | | 0.61 | | 8.71 | 14.3 | B | A |
| Example 35 | | 16.3 | | | | | | | 0.61 | | 13.07 | 21.4 | C | A |
| Example 36 | | 21.8 | | | | | | | 0.61 | | 17.43 | 28.6 | C | A |
| Example 37 | MCM-41 | 1.1 | None | 1000 | | | | | 0.61 | | 0.09 | 0.1 | C | C |
| Example 38 | | | | 500 | | | | | 0.61 | | 0.26 | 0.4 | C | C |
| Example 39 | | | | 200 | | | | | 0.61 | | 0.44 | 0.7 | B | C |
| Example 40 | | | | 100 | | | | | 0.61 | | 0.87 | 1.4 | A | B |
| Example 41 | | 1.6 | | | | | | | 0.61 | | 1.31 | 2.1 | A | B |
| Example 42 | | 2.0 | | | | | | | 0.61 | | 1.57 | 2.6 | A | B |
| Example 43 | | 2.2 | | | | | | | 0.61 | | 1.74 | 2.9 | B | A |
| Example 44 | | 2.7 | | | | | | | 0.61 | | 2.18 | 3.6 | B | A |
| Example 45 | | 5.4 | | | | | | | 0.61 | | 4.36 | 7.1 | C | A |
| Example 46 | SBA-1 | 10.9 | | | | | | | 0.61 | | 8.71 | 14.3 | C | A |
| Example 47 | | 16.3 | | | | | | | 0.61 | | 13.07 | 21.4 | C | A |
| Example 48 | | 21.8 | | | | | | | 0.61 | | 17.43 | 28.6 | C | A |

TABLE 2

| | | Making Conditions for Functional Structural Body | | | | | | Functional Structural Body | | | | | |
|---|---|---|---|---|---|---|---|---|---|---|---|---|---|
| | | Precursor Material (A) | Addition to Precursor Material (A) | | Hydrothermal Treatment Conditions for Precursor Material (C) | | | Skeletal body Zeolite-Type Compound | | Functional Substance Metallic Nanoparticles | | Performance Evaluation | |
| No. | Type | Pore Diameter (nm) | Presence or Absence of Additives | Conversion Ratio (ratio of number of atoms) Si/M of Added Amount of Metal Containing Solution | Type of Structure Directing agent | pH | Time (h) | Framework | Average Inner Diameter $D_F$ of Channels (nm) | Type | Average Particle Size $D_C$ (nm) | $D_C/D_F$ | Catalytic Activity | Durability |
| Example 49 | MCM- | 1.0 | Yes | 1000 | TPABr | 12 | 72 | MFI | 0.56 | Co | 0.08 | 0.1 | C | C |
| Example 50 | 41 | 1.0 | | 500 | | | | | 0.56 | | 0.24 | 0.4 | C | C |
| Example 51 | | 1.0 | | 200 | | | | | 0.56 | | 0.40 | 0.7 | B | C |
| Example 52 | | 1.0 | | 100 | | | | | 0.56 | | 0.80 | 1.4 | A | B |
| Example 53 | | 1.5 | | | | | | | 0.56 | | 1.20 | 2.1 | A | B |
| Example 54 | | 1.8 | | | | | | | 0.56 | | 1.44 | 2.6 | A | A |
| Example 55 | | 2.0 | | | | | | | 0.56 | | 1.60 | 2.9 | A | A |
| Example 56 | | 2.5 | | | | | | | 0.56 | | 2.00 | 3.6 | A | A |
| Example 57 | | 5.0 | | | | | | | 0.56 | | 4.00 | 7.1 | B | A |
| Example 58 | SBA- | 10.0 | | | | | | | 0.56 | | 8.00 | 14.3 | B | A |
| Example 59 | 1 | 15.0 | | | | | | | 0.56 | | 12.00 | 21.4 | C | A |
| Example 60 | | 20.0 | | | | | | | 0.56 | | 16.00 | 28.6 | C | A |
| Example 61 | MCM- | 1.0 | None | 1000 | | | | | 0.56 | | 0.08 | 0.1 | C | C |
| Example 62 | 41 | 1.0 | | 500 | | | | | 0.56 | | 0.24 | 0.4 | C | C |
| Example 63 | | 1.0 | | 200 | | | | | 0.56 | | 0.40 | 0.7 | B | C |
| Example 64 | | 1.0 | | 100 | | | | | 0.56 | | 0.80 | 1.4 | A | B |
| Example 65 | | 1.5 | | | | | | | 0.56 | | 1.20 | 2.1 | A | B |
| Example 66 | | 1.8 | | | | | | | 0.56 | | 1.44 | 2.6 | B | A |
| Example 67 | | 2.0 | | | | | | | 0.56 | | 1.60 | 2.9 | B | A |
| Example 68 | | 2.5 | | | | | | | 0.56 | | 2.00 | 3.6 | B | A |
| Example 69 | | 5.0 | | | | | | | 0.56 | | 4.00 | 7.1 | C | A |
| Example 70 | SBA- | 10.0 | | | | | | | 0.56 | | 8.00 | 14.3 | C | A |
| Example 71 | 1 | 15.0 | | | | | | | 0.56 | | 12.00 | 21.4 | C | A |
| Example 72 | | 20.0 | | | | | | | 0.56 | | 16.00 | 28.6 | C | A |
| Example 73 | MCM- | 1.0 | Yes | 1000 | TMABr | 12 | 120 | FER | 0.57 | | 0.08 | 0.1 | C | C |
| Example 74 | 41 | 1.0 | | 500 | | | | | 0.57 | | 0.24 | 0.4 | C | C |
| Example 75 | | 1.0 | | 200 | | | | | 0.57 | | 0.41 | 0.7 | B | C |
| Example 76 | | 1.0 | | 100 | | | | | 0.57 | | 0.81 | 1.4 | A | B |
| Example 77 | | 1.5 | | | | | | | 0.57 | | 1.22 | 2.1 | A | B |
| Example 78 | | 1.8 | | | | | | | 0.57 | | 1.47 | 2.6 | A | B |
| Example 79 | | 2.0 | | | | | | | 0.57 | | 1.63 | 2.9 | A | A |
| Example 80 | | 2.5 | | | | | | | 0.57 | | 2.04 | 3.6 | A | A |
| Example 81 | | 5.1 | | | | | | | 0.57 | | 4.07 | 7.1 | B | A |
| Example 82 | SBA- | 10.2 | | | | | | | 0.57 | | 8.14 | 14.3 | B | A |
| Example 83 | 1 | 15.3 | | | | | | | 0.57 | | 12.21 | 21.4 | C | A |
| Example 84 | | 20.4 | | | | | | | 0.57 | | 16.29 | 28.6 | C | A |
| Example 85 | MCM- | 1.0 | None | 1000 | | | | | 0.57 | | 0.08 | 0.1 | C | C |
| Example 86 | 41 | 1.0 | | 500 | | | | | 0.57 | | 0.24 | 0.4 | C | C |
| Example 87 | | 1.0 | | 200 | | | | | 0.57 | | 0.41 | 0.7 | B | C |
| Example 88 | | 1.0 | | 100 | | | | | 0.57 | | 0.81 | 1.4 | A | B |
| Example 89 | | 1.5 | | | | | | | 0.57 | | 1.22 | 2.1 | A | B |
| Example 90 | | 1.8 | | | | | | | 0.57 | | 1.47 | 2.6 | A | B |
| Example 91 | | 2.0 | | | | | | | 0.57 | | 1.63 | 2.9 | B | A |
| Example 92 | | 2.5 | | | | | | | 0.57 | | 2.04 | 3.6 | B | A |
| Example 93 | | 5.1 | | | | | | | 0.57 | | 4.07 | 7.1 | C | A |
| Example 94 | SBA- | 10.2 | | | | | | | 0.57 | | 8.14 | 14.3 | C | A |
| Example 95 | 1 | 15.3 | | | | | | | 0.57 | | 12.21 | 21.4 | C | A |
| Example 96 | | 20.4 | | | | | | | 0.57 | | 16.29 | 28.6 | C | A |

TABLE 3

| No. | Precursor Material (A) Type | Precursor Material (A) Pore Diameter (nm) | Presence or Absence of Additives | Conversion Ratio (ratio of number of atoms) Si/M of Added Amount of Metal Containing Solution | Hydrothermal Treatment Conditions for Precursor Material (C) Directing agent | pH | Time (h) | Framework | Skeletal body Zeolite-Type Compound Average Inner Diameter $D_F$ of Channels (nm) | Metallic Nanoparticles Type | Metallic Nanoparticles Average Particle Size $D_C$ (nm) | $D_C/D_F$ | Catalytic Activity | Durability |
|---|---|---|---|---|---|---|---|---|---|---|---|---|---|---|
| Example 97 | MCM-41 | 1.3 | Yes | 1000 | TEABr | 12 | 72 | FAU | 0.74 | Ni | 0.11 | 0.1 | C | C |
| Example 98 | | | | 500 | | | | | 0.74 | | 0.32 | 0.4 | C | C |
| Example 99 | | | | 200 | | | | | 0.74 | | 0.53 | 0.7 | B | C |
| Example 100 | | | | 100 | | | | | 0.74 | | 1.06 | 1.4 | A | B |
| Example 101 | | 2.0 | | | | | | | 0.74 | | 1.59 | 2.1 | A | B |
| Example 102 | | 2.4 | | | | | | | 0.74 | | 1.90 | 2.6 | A | A |
| Example 103 | | 2.6 | | | | | | | 0.74 | | 2.11 | 2.9 | A | A |
| Example 104 | | 3.3 | | | | | | | 0.74 | | 2.64 | 3.6 | A | A |
| Example 105 | | 6.6 | | | | | | | 0.74 | | 5.29 | 7.1 | B | A |
| Example 106 | SBA-1 | 13.2 | | | | | | | 0.74 | | 10.57 | 14.3 | B | A |
| Example 107 | | 19.8 | | | | | | | 0.74 | | 15.86 | 21.4 | C | A |
| Example 108 | | 26.4 | | | | | | | 0.74 | | 21.14 | 28.6 | C | A |
| Example 109 | MCM-41 | 1.3 | None | 1000 | | | | | 0.74 | | 0.11 | 0.1 | C | C |
| Example 110 | | | | 500 | | | | | 0.74 | | 0.32 | 0.4 | C | C |
| Example 111 | | | | 200 | | | | | 0.74 | | 0.53 | 0.7 | B | C |
| Example 112 | | | | 100 | | | | | 0.74 | | 1.06 | 1.4 | A | B |
| Example 113 | | 2.0 | | | | | | | 0.74 | | 1.59 | 2.1 | A | B |
| Example 114 | | 2.4 | | | | | | | 0.74 | | 1.90 | 2.6 | B | A |
| Example 115 | | 2.6 | | | | | | | 0.74 | | 2.11 | 2.9 | B | A |
| Example 116 | | 3.3 | | | | | | | 0.74 | | 2.64 | 3.6 | B | A |
| Example 117 | | 6.6 | | | | | | | 0.74 | | 5.29 | 7.1 | C | A |
| Example 118 | SBA-1 | 13.2 | | | | | | | 0.74 | | 10.57 | 14.3 | C | A |
| Example 119 | | 19.8 | | | | | | | 0.74 | | 15.86 | 21.4 | C | A |
| Example 120 | | 26.4 | | | | | | | 0.74 | | 21.14 | 28.6 | C | A |
| Example 121 | MCM-41 | 1.1 | Yes | 1000 | | 11 | 72 | MTW | 0.61 | | 0.09 | 0.1 | C | C |
| Example 122 | | | | 500 | | | | | 0.61 | | 0.26 | 0.4 | C | C |
| Example 123 | | | | 200 | | | | | 0.61 | | 0.44 | 0.7 | B | C |
| Example 124 | | | | 100 | | | | | 0.61 | | 0.87 | 1.4 | A | B |
| Example 125 | | 1.6 | | | | | | | 0.61 | | 1.31 | 2.1 | A | B |
| Example 126 | | 2.0 | | | | | | | 0.61 | | 1.57 | 2.6 | A | B |
| Example 127 | | 2.2 | | | | | | | 0.61 | | 1.74 | 2.9 | A | A |
| Example 128 | | 2.7 | | | | | | | 0.61 | | 2.18 | 3.6 | A | A |
| Example 129 | | 5.4 | | | | | | | 0.61 | | 4.36 | 7.1 | B | A |
| Example 130 | SBA-1 | 10.9 | | | | | | | 0.61 | | 8.71 | 14.3 | B | A |

TABLE 3-continued

| | Making Conditions for Functional Structural Body | | | | | | | | Functional Structural Body | | | | | |
|---|---|---|---|---|---|---|---|---|---|---|---|---|---|---|
| | | | Addition to Precursor Material (A) | | | | | | Skeletal body Zeolite-Type Compound | Functional Substance Metallic Nanoparticles | | | Performance Evaluation | |
| | Precursor Material (A) | | Presence or Absence of Additives | Conversion Ratio (ratio of number of atoms) Si/M of Added Amount of Metal Containing Solution | Hydrothermal Treatment Conditions for Precursor Material (C) | | | | Average Inner Diameter $D_F$ of Channels (nm) | | Average Particle Size $D_C$ (nm) | $D_C/D_F$ | Catalytic Activity | Durability |
| No. | Type | Pore Diameter (nm) | | | Type of Structure Directing agent | pH | Time (h) | Framework | | Type | | | | |
| Example 131 | | 16.3 | | | | | | | 0.61 | | 13.07 | 21.4 | C | A |
| Example 132 | | 21.8 | | | | | | | 0.61 | | 17.43 | 28.6 | C | A |
| Example 133 | MCM-41 | 1.1 | None | 1000 | | | | | 0.61 | | 0.09 | 0.1 | C | C |
| Example 134 | | | | 500 | | | | | 0.61 | | 0.26 | 0.4 | C | C |
| Example 135 | | | | 200 | | | | | 0.61 | | 0.44 | 0.7 | B | C |
| Example 136 | | | | 100 | | | | | 0.61 | | 0.87 | 1.4 | A | B |
| Example 137 | | 1.6 | | | | | | | 0.61 | | 1.31 | 2.1 | A | B |
| Example 138 | | 2.0 | | | | | | | 0.61 | | 1.57 | 2.6 | A | B |
| Example 139 | | 2.2 | | | | | | | 0.61 | | 1.74 | 2.9 | B | A |
| Example 140 | | 2.7 | | | | | | | 0.61 | | 2.18 | 3.6 | B | A |
| Example 141 | | 5.4 | | | | | | | 0.61 | | 4.36 | 7.1 | C | A |
| Example 142 | SBA-1 | 10.9 | | | | | | | 0.61 | | 8.71 | 14.3 | C | A |
| Example 143 | | 16.3 | | | | | | | 0.61 | | 13.07 | 21.4 | C | A |
| Example 144 | | 21.8 | | | | | | | 0.61 | | 17.43 | 28.6 | C | A |

TABLE 4

| | Making Conditions for Functional Structural Body | | | | | | | | Functional Structural Body | | | | | |
|---|---|---|---|---|---|---|---|---|---|---|---|---|---|---|
| | | | Addition to Precursor Material (A) | | Hydrothermal Treatment Conditions for Precursor Material (C) | | | | Skeletal body Zeolite-Type Compound | Functional Substance Metallic Nanoparticles | | | Performance Evaluation | |
| | Precursor Material (A) | | Presence or Absence of Additives | Conversion Ratio (ratio of number of atoms) Si/M of Added Amount of Metal Containing Solution | Type of Structure Directing agent | pH | Time (h) | Framework | Average Inner Diameter $D_F$ of Channels (nm) | Type | Average Particle Size $D_C$ (nm) | $D_C/D_F$ | Catalytic Activity | Durability |
| No. | Type | Pore Diameter (nm) | | | | | | | | | | | | |
| Example 145 | MCM-41 | 1.0 | Yes | 1000 | TPABr | 12 | 72 | MFI | 0.56 | Ni | 0.08 | 0.1 | C | C |
| Example 146 | | 1.0 | | 500 | | | | | 0.56 | | 0.24 | 0.4 | C | C |
| Example 147 | | 1.0 | | 200 | | | | | 0.56 | | 0.40 | 0.7 | B | C |

TABLE 4-continued

| | | Making Conditions for Functional Structural Body | | | | | | | Functional Structural Body | | | | | |
|---|---|---|---|---|---|---|---|---|---|---|---|---|---|---|
| | | Precursor Material (A) | Addition to Precursor Material (A) | | Hydrothermal Treatment Conditions for Precursor Material (C) | | | | Skeletal body Zeolite-Type Compound | | Functional Substance Metallic Nanoparticles | | Performance Evaluation | |
| No. | Type | Pore Diameter (nm) | Presence or Absence of Additives | Conversion Ratio (ratio of number of atoms) Si/M of Added Amount of Metal Containing Solution | Type of Structure Directing agent | pH | Time (h) | Framework | Average Inner Diameter $D_F$ of Channels (nm) | Type | Average Particle Size $D_C$ (nm) | $D_C/D_F$ | Catalytic Activity | Durability |
| Example 148 | | 1.0 | | 100 | | | | | 0.56 | | 0.80 | 1.4 | A | B |
| Example 149 | | 1.5 | | | | | | | 0.56 | | 1.20 | 2.1 | A | B |
| Example 150 | | 1.8 | | | | | | | 0.56 | | 1.44 | 2.6 | A | A |
| Example 151 | | 2.0 | | | | | | | 0.56 | | 1.60 | 2.9 | A | A |
| Example 152 | | 2.5 | | | | | | | 0.56 | | 2.00 | 3.6 | A | A |
| Example 153 | | 5.0 | | | | | | | 0.56 | | 4.00 | 7.1 | B | A |
| Example 154 | SBA-1 | 10.0 | | | | | | | 0.56 | | 8.00 | 14.3 | B | A |
| Example 155 | | 15.0 | | | | | | | 0.56 | | 12.00 | 21.4 | C | A |
| Example 156 | | 20.0 | | | | | | | 0.56 | | 16.00 | 28.6 | C | A |
| Example 157 | MCM-41 | 1.0 | None | 1000 | | | | | 0.56 | | 0.08 | 0.1 | C | C |
| Example 158 | | 1.0 | | 500 | | | | | 0.56 | | 0.24 | 0.4 | C | C |
| Example 159 | | 1.0 | | 200 | | | | | 0.56 | | 0.40 | 0.7 | B | C |
| Example 160 | | 1.0 | | 100 | | | | | 0.56 | | 0.80 | 1.4 | A | B |
| Example 161 | | 1.5 | | | | | | | 0.56 | | 1.20 | 2.1 | A | B |
| Example 162 | | 1.8 | | | | | | | 0.56 | | 1.44 | 2.6 | B | A |
| Example 163 | | 2.0 | | | | | | | 0.56 | | 1.60 | 2.9 | B | A |
| Example 164 | | 2.5 | | | | | | | 0.56 | | 2.00 | 3.6 | B | A |
| Example 165 | | 5.0 | | | | | | | 0.56 | | 4.00 | 7.1 | C | A |
| Example 166 | SBA-1 | 10.0 | | | | | | | 0.56 | | 8.00 | 14.3 | C | A |
| Example 167 | | 15.0 | | | | | | | 0.56 | | 12.00 | 21.4 | C | A |
| Example 168 | | 20.0 | | | | | | | 0.56 | | 16.00 | 28.6 | C | A |
| Example 169 | MCM-41 | 1.0 | Yes | 1000 | TMABr | 12 | 120 | FER | 0.57 | | 0.08 | 0.1 | C | C |
| Example 170 | | 1.0 | | 500 | | | | | 0.57 | | 0.24 | 0.4 | C | C |
| Example 171 | | 1.0 | | 200 | | | | | 0.57 | | 0.41 | 0.7 | B | C |
| Example 172 | | 1.0 | | 100 | | | | | 0.57 | | 0.81 | 1.4 | A | B |
| Example 173 | | 1.5 | | | | | | | 0.57 | | 1.22 | 2.1 | A | B |
| Example 174 | | 1.8 | | | | | | | 0.57 | | 1.47 | 2.6 | A | B |
| Example 175 | | 2.0 | | | | | | | 0.57 | | 1.63 | 2.9 | A | A |
| Example 176 | | 2 5 | | | | | | | 0.57 | | 2.04 | 3.6 | A | A |
| Example 177 | | 5.1 | | | | | | | 0.57 | | 4.07 | 7.1 | B | A |
| Example 178 | SBA-1 | 10.2 | | | | | | | 0.57 | | 8.14 | 14.3 | B | A |
| Example 179 | | 15.3 | | | | | | | 0.57 | | 12.21 | 21.4 | C | A |

TABLE 4-continued

| | | Making Conditions for Functional Structural Body | | | | | | Functional Structural Body | | | | | |
|---|---|---|---|---|---|---|---|---|---|---|---|---|---|
| | | Precursor Material (A) | Addition to Precursor Material (A) | Conversion Ratio (ratio of number of atoms) Si/M of Added Amount of Metal Containing Solution | Hydrothermal Treatment Conditions for Precursor Material (C) | | | Skeletal body Zeolite-Type Compound | | Functional Substance Metallic Nanoparticles | | Performance Evaluation | |
| No. | Type | Pore Diameter (nm) | Presence or Absence of Additives | | Type of Structure Directing agent | pH | Time (h) | Framework | Average Inner Diameter $D_F$ of Channels (nm) | Type | Average Particle Size $D_C$ (nm) | $D_C/D_F$ | Catalytic Activity | Durability |
| Example 180 | | 20.4 | | | | | | | 0.57 | | 16.29 | 28.6 | C | A |
| Example 181 | MCM-41 | 1.0 | None | 1000 | | | | | 0.57 | | 0.08 | 0.1 | C | C |
| Example 182 | | 1.0 | | 500 | | | | | 0.57 | | 0.24 | 0.4 | C | C |
| Example 183 | | 1.0 | | 200 | | | | | 0.57 | | 0.41 | 0.7 | B | C |
| Example 184 | | 1.0 | | 100 | | | | | 0.57 | | 0.81 | 1.4 | A | B |
| Example 185 | | 1.5 | | | | | | | 0.57 | | 1.22 | 2.1 | A | B |
| Example 186 | | 1.8 | | | | | | | 0.57 | | 1.47 | 2.6 | A | B |
| Example 187 | | 2.0 | | | | | | | 0.57 | | 1.63 | 2.9 | B | A |
| Example 188 | | 2.5 | | | | | | | 0.57 | | 2.04 | 3.6 | B | A |
| Example 189 | | 5.1 | | | | | | | 0.57 | | 4.07 | 7.1 | C | A |
| Example 190 | SBA-1 | 10.2 | | | | | | | 0.57 | | 8.14 | 14.3 | C | A |
| Example 191 | | 15.3 | | | | | | | 0.57 | | 12.21 | 21.4 | C | A |
| Example 192 | | 20.4 | | | | | | | 0.57 | | 16.29 | 28.6 | C | A |

TABLE 5

| | | Making Conditions for Functional Structural Body | | | | | | Functional Structural Body | | | | | |
|---|---|---|---|---|---|---|---|---|---|---|---|---|---|
| | | Precursor Material (A) | Addition to Precursor Material (A) | Conversion Ratio (ratio of number of atoms) Si/M of Added Amount of Metal Containing Solution | Hydrothermal Treatment Conditions for Precursor Material (C) | | | Skeletal body Zeolite-Type Compound | | Functional Substance Metallic Nanoparticles | | Performance Evaluation | |
| No. | Type | Pore Diameter (nm) | Presence or Absence of Additives | | Type of Structure Directing agent | pH | Time (h) | Framework | Average Inner Diameter $D_F$ of Channels (nm) | Type | Average Particle Size $D_C$ (nm) | $D_C/D_F$ | Catalytic Activity | Durability |
| Example 193 | MCM-41 | 1.3 | Yes | 1000 | TEABr | 12 | 120 | FAU | 0.74 | Fe | 0.11 | 0.1 | C | C |
| Example 194 | | | | 500 | | | | | 0.74 | | 0.32 | 0.4 | C | C |
| Example 195 | | | | 200 | | | | | 0.74 | | 0.53 | 0.7 | B | C |
| Example 196 | | | | 100 | | | | | 0.74 | | 1.06 | 1.4 | A | B |
| Example 197 | | 2.0 | | | | | | | 0.74 | | 1.59 | 2.1 | A | B |
| Example 198 | | 2.4 | | | | | | | 0.74 | | 1.90 | 2.6 | A | A |
| Example 199 | | 2.6 | | | | | | | 0.74 | | 2.11 | 2.9 | A | A |

TABLE 5-continued

| | Making Conditions for Functional Structural Body | | | | | | | Functional Structural Body | | | | | | |
|---|---|---|---|---|---|---|---|---|---|---|---|---|---|---|
| | Precursor Material (A) | | Addition to Precursor Material (A) | | Hydrothermal Treatment Conditions for Precursor Material (C) | | | Skeletal body Zeolite-Type Compound | | Functional Substance Metallic Nanoparticles | | | Performance Evaluation | |
| No. | Type | Pore Diameter (nm) | Presence or Absence of Additives | Conversion Ratio (ratio of number of atoms) Si/M of Added Amount of Metal Containing Solution | Type of Structure Directing agent | pH | Time (h) | Framework | Average Inner Diameter $D_F$ of Channels (nm) | Type | Average Particle Size $D_C$ (nm) | $D_C/D_F$ | Catalytic Activity | Durability |
| Example 200 | | 3.3 | | | | | | | 0.74 | | 2.64 | 3.6 | A | A |
| Example 201 | | 6.6 | | | | | | | 0.74 | | 5.29 | 7.1 | B | A |
| Example 202 | SBA-1 | 13.2 | | | | | | | 0.74 | | 10.57 | 14.3 | B | A |
| Example 203 | | 19.8 | | | | | | | 0.74 | | 15.86 | 21.4 | C | A |
| Example 204 | | 26.4 | | | | | | | 0.74 | | 21.14 | 28.6 | C | A |
| Example 205 | MCM-41 | 1.3 | None | 1000 | | | | | 0.74 | | 0.11 | 0.1 | C | C |
| Example 206 | | | | 500 | | | | | 0.74 | | 0.32 | 0.4 | C | C |
| Example 207 | | | | 200 | | | | | 0.74 | | 0.53 | 0.7 | B | C |
| Example 208 | | | | 100 | | | | | 0.74 | | 1.06 | 1.4 | A | B |
| Example 209 | | 2.0 | | | | | | | 0.74 | | 1.59 | 2.1 | A | B |
| Example 210 | | 2.4 | | | | | | | 0.74 | | 1.90 | 2.6 | B | A |
| Example 211 | | 2.6 | | | | | | | 0.74 | | 2.11 | 2.9 | B | A |
| Example 212 | | 3.3 | | | | | | | 0.74 | | 2.64 | 3.6 | B | A |
| Example 213 | | 6.6 | | | | | | | 0.74 | | 5.29 | 7.1 | C | A |
| Example 214 | SBA-1 | 13.2 | | | | | | | 0.74 | | 10.57 | 14.3 | C | A |
| Example 215 | | 19.8 | | | | | | | 0.74 | | 15.86 | 21.4 | C | A |
| Example 216 | | 26.4 | | | | | | | 0.74 | | 21.14 | 28.6 | C | A |
| Example 217 | MCM-41 | 1.1 | Yes | 1000 | | 11 | 72 | MTW | 0.61 | | 0.09 | 0.1 | C | C |
| Example 218 | | | | 500 | | | | | 0.61 | | 0.26 | 0.4 | C | C |
| Example 219 | | | | 200 | | | | | 0.61 | | 0.44 | 0.7 | B | C |
| Example 220 | | | | 100 | | | | | 0.61 | | 0.87 | 1.4 | A | B |
| Example 221 | | 1.6 | | | | | | | 0.61 | | 1.31 | 2.1 | A | B |
| Example 222 | | 2.0 | | | | | | | 0.61 | | 1.57 | 2.6 | A | B |
| Example 223 | | 2.2 | | | | | | | 0.61 | | 1.74 | 2.9 | A | A |
| Example 224 | | 2.7 | | | | | | | 0.61 | | 2.18 | 3.6 | A | A |
| Example 225 | | 5.4 | | | | | | | 0.61 | | 4.36 | 7.1 | B | A |
| Example 226 | SBA-1 | 10.9 | | | | | | | 0.61 | | 8.71 | 14.3 | B | A |
| Example 227 | | 16.3 | | | | | | | 0.61 | | 13.07 | 21.4 | C | A |
| Example 228 | | 21.8 | | | | | | | 0.61 | | 17.43 | 28.6 | C | A |
| Example 229 | MCM-41 | 1.1 | None | 1000 | | | | | 0.61 | | 0.09 | 0.1 | C | C |
| Example 230 | | | | 500 | | | | | 0.61 | | 0.26 | 0.4 | C | C |

TABLE 5-continued

| | Making Conditions for Functional Structural Body | | | | | | | Functional Structural Body | | | | | |
|---|---|---|---|---|---|---|---|---|---|---|---|---|---|
| | Precursor Material (A) | | Addition to Precursor Material (A) | | Hydrothermal Treatment Conditions for Precursor Material (C) | | | Skeletal body Zeolite-Type Compound | Functional Substance Metallic Nanoparticles | | | Performance Evaluation | |
| No. | Type | Pore Diameter (nm) | Presence or Absence of Additives | Conversion Ratio (ratio of number of atoms) Si/M of Added Amount of Metal Containing Solution | Type of Structure Directing agent | pH | Time (h) | Average Inner Diameter $D_F$ of Channels (nm) | Type | Average Particle Size $D_C$ (nm) | $D_C/D_F$ | Catalytic Activity | Durability |
| Example 231 | | | | 200 | | | | 0.61 | | 0.44 | 0.7 | B | C |
| Example 232 | | | | 100 | | | | 0.61 | | 0.87 | 1.4 | A | B |
| Example 233 | | 1.6 | | | | | | 0.61 | | 1.31 | 2.1 | A | B |
| Example 234 | | 2 | | | | | | 0.61 | | 1.57 | 2.6 | A | B |
| Example 235 | | 2.2 | | | | | | 0.61 | | 1.74 | 2.9 | B | A |
| Example 236 | | 2.7 | | | | | | 0.61 | | 2.18 | 3.6 | B | A |
| Example 237 | | 5.4 | | | | | | 0.61 | | 4.36 | 7.1 | C | A |
| Example 238 | SBA-1 | 10.9 | | | | | | 0.61 | | 8.71 | 14.3 | C | A |
| Example 239 | | 16.3 | | | | | | 0.61 | | 13.07 | 21.4 | C | A |
| Example 240 | | 21.8 | | | | | | 0.61 | | 17.43 | 28.6 | C | A |

TABLE 6

| | Making Conditions for Functional Structural Body | | | | | | | |
|---|---|---|---|---|---|---|---|---|
| | Precursor Material (A) | | Addition to Precursor Material (A) | | Hydrothermal Treatment Conditions for Precursor Material (C) | | | |
| No. | Type | Pore Diameter (nm) | Presence or Absence of Additives | Conversion Ratio (ratio of number of atoms) Si/M of Added Amount of Metal Containing Solution | Type of Structure Directing agent | pH | Time (h) | |
| Example 241 | MCM-41 | 1.0 | Yes | 1000 | TPABr | 12 | 72 | |
| Example 242 | | 1.0 | | 500 | | | | |
| Example 243 | | 1.0 | | 200 | | | | |
| Example 244 | | 1.0 | | 100 | | | | |
| Example 245 | | 1.5 | | | | | | |
| Example 246 | | 1.8 | | | | | | |
| Example 247 | | 2.0 | | | | | | |
| Example 248 | | 2.5 | | | | | | |
| Example 249 | | 5.0 | | | | | | |
| Example 250 | SBA-1 | 10.0 | | | | | | |
| Example 251 | | 15.0 | | | | | | |
| Example 252 | | 20.0 | | | | | | |

TABLE 6-continued

| Example | | | | | | | |
|---|---|---|---|---|---|---|---|
| Example 253 | MCM-41 | 1.0 | None | 1000 | | | |
| Example 254 | | 1.0 | | 500 | | | |
| Example 255 | | 1.0 | | 200 | | | |
| Example 256 | | 1.0 | | 100 | | | |
| Example 257 | | 1.5 | | | | | |
| Example 258 | | 1.8 | | | | | |
| Example 259 | | 2.0 | | | | | |
| Example 260 | | 2.5 | | | | | |
| Example 261 | | 5.0 | | | | | |
| Example 262 | SBA-1 | 10.0 | | | | | |
| Example 263 | | 15.0 | | | | | |
| Example 264 | | 20.0 | | | | | |
| Example 265 | MCM-41 | 1.0 | Yes | 1000 | TMABr | 12 | 120 |
| Example 266 | | 1.0 | | 500 | | | |
| Example 267 | | 1.0 | | 200 | | | |
| Example 268 | | 1.0 | | 100 | | | |
| Example 269 | | 1.5 | | | | | |
| Example 270 | | 1.8 | | | | | |
| Example 271 | | 2.0 | | | | | |
| Example 272 | | 2.5 | | | | | |
| Example 273 | | 5.1 | | | | | |
| Example 274 | SBA-1 | 10.2 | | | | | |
| Example 275 | | 15.3 | | | | | |
| Example 276 | | 20.4 | | | | | |
| Example 277 | MCM-41 | 1.0 | None | 1000 | | | |
| Example 278 | | 1.0 | | 500 | | | |
| Example 279 | | 1.0 | | 200 | | | |
| Example 280 | | 1.0 | | 100 | | | |
| Example 281 | | 1.5 | | | | | |
| Example 282 | | 1.8 | | | | | |
| Example 283 | | 2.0 | | | | | |
| Example 284 | | 2.5 | | | | | |
| Example 285 | | 5.1 | | | | | |
| Example 286 | SBA-1 | 10.2 | | | | | |
| Example 287 | | 15.3 | | | | | |
| Example 288 | | 20.4 | | | | | |

TABLE 6-continued

| | Functional Structural Body | | | | | | |
|---|---|---|---|---|---|---|---|
| | Skeletal body Zeolite-Type Compound | | Functional Substance Metallic Nanoparticles | | | Performance Evaluation | |
| No. | Framework | Average Inner Diameter $D_F$ of Channels$_F$ (nm) | Type | Average Particle Size $D_C$ (nm) | $D_C/D_F$ | Catalytic Activity | Durability |
| Example 241 | MFI | 0.56 | Fe | 0.08 | 0.1 | C | C |
| Example 242 | | 0.56 | | 0.24 | 0.4 | C | C |
| Example 243 | | 0.56 | | 0.40 | 0.7 | B | C |
| Example 244 | | 0.56 | | 0.80 | 1.4 | A | B |
| Example 245 | | 0.56 | | 1.20 | 2.1 | A | B |
| Example 246 | | 0.56 | | 1.44 | 2.6 | A | A |
| Example 247 | | 0.56 | | 1.60 | 2.9 | A | A |
| Example 248 | | 0.56 | | 2.00 | 3.6 | A | A |
| Example 249 | | 0.56 | | 4.00 | 7.1 | B | A |
| Example 250 | | 0.56 | | 8.00 | 14.3 | B | A |
| Example 251 | | 0.56 | | 12.00 | 21.4 | C | A |
| Example 252 | | 0.56 | | 16.00 | 28.6 | C | A |
| Example 253 | | 0.56 | | 0.08 | 0.1 | C | C |
| Example 254 | | 0.56 | | 0.24 | 0.4 | C | C |
| Example 255 | | 0.56 | | 0.40 | 0.7 | B | C |
| Example 256 | | 0.56 | | 0.80 | 1.4 | A | B |
| Example 257 | | 0.56 | | 1.20 | 2.1 | A | B |
| Example 258 | | 0.56 | | 1.44 | 2.6 | B | A |
| Example 259 | | 0.56 | | 1.60 | 2.9 | B | A |
| Example 260 | | 0.56 | | 2.00 | 3.6 | B | A |
| Example 261 | | 0.56 | | 4.00 | 7.1 | C | A |
| Example 262 | | 0.56 | | 8.00 | 14.3 | C | A |
| Example 263 | | 0.56 | | 12.00 | 21.4 | C | A |
| Example 264 | | 0.56 | | 16.00 | 28.6 | C | A |
| Example 265 | FER | 0.57 | | 0.08 | 0.1 | C | C |
| Example 266 | | 0.57 | | 0.24 | 0.4 | C | C |
| Example 267 | | 0.57 | | 0.41 | 0.7 | B | C |
| Example 268 | | 0.57 | | 0.81 | 1.4 | A | B |
| Example 269 | | 0.57 | | 1.22 | 2.1 | A | B |
| Example 270 | | 0.57 | | 1.47 | 2.6 | A | B |
| Example 271 | | 0.57 | | 1.63 | 2.9 | A | A |
| Example 272 | | 0.57 | | 2.04 | 3.6 | A | A |
| Example 273 | | 0.57 | | 4.07 | 7.1 | B | A |

TABLE 6-continued

| | | | | | |
|---|---|---|---|---|---|
| Example 274 | 0.57 | 8.14 | 14.3 | B | A |
| Example 275 | 0.57 | 12.21 | 21.4 | C | A |
| Example 276 | 0.57 | 16.29 | 28.6 | C | A |
| Example 277 | 0.57 | 0.08 | 0.1 | C | C |
| Example 278 | 0.57 | 0.24 | 0.4 | C | C |
| Example 279 | 0.57 | 0.41 | 0.7 | B | C |
| Example 280 | 0.57 | 0.81 | 1.4 | A | B |
| Example 281 | 0.57 | 1.22 | 2.1 | A | B |
| Example 282 | 0.57 | 1.47 | 2.6 | A | B |
| Example 283 | 0.57 | 1.63 | 2.9 | B | A |
| Example 284 | 0.57 | 2.04 | 3.6 | B | A |
| Example 285 | 0.57 | 4.07 | 7.1 | C | A |
| Example 286 | 0.57 | 8.14 | 14.3 | C | A |
| Example 287 | 0.57 | 12.21 | 21.4 | C | A |
| Example 288 | 0.57 | 16.29 | 28.6 | C | A |

TABLE 7

| | Making Conditions for Functional Structural Body | | | | | |
|---|---|---|---|---|---|---|
| | Precursor Material (A) | | Addition to Precursor Material (A) | | Hydrothermal Treatment Conditions for Precursor Material (C) | | |
| No. | Type | Pore Diameter (nm) | Presence or Absence of Additives | Conversion Ratio (ratio of number of atoms) Si/M of Added Amount of Metal Containing Solution | Type of Structure Directing agent | pH | Time (h) |
| Example 289 | MCM-41 | 1.3 | Yes | 1000 | TEABr | 12 | 120 |
| Example 290 | | | | 500 | | | |
| Example 291 | | | | 200 | | | |
| Example 292 | | | | 100 | | | |
| Example 293 | | 2.0 | | | | | |
| Example 294 | | 2.4 | | | | | |
| Example 295 | | 2.6 | | | | | |
| Example 296 | | 3.3 | | | | | |
| Example 297 | | 6.6 | | | | | |
| Example 298 | SBA-1 | 13.2 | | | | | |
| Example 299 | | 19.8 | | | | | |
| Example 300 | | 26.4 | | | | | |
| Example 301 | MCM-41 | 1.3 | None | 1000 | | | |
| Example 302 | | | | 500 | | | |
| Example 303 | | | | 200 | | | |
| Example 304 | | | | 100 | | | |

TABLE 7-continued

| No. | Framework | Average Inner Diameter $D_F$ of Channels (nm) | Type | Average Particle Size $D_C$ (nm) | $D_C/D_F$ | Catalytic Activity | Durability |
|---|---|---|---|---|---|---|---|
| Example 305 | | 2.0 | | | | | |
| Example 306 | | 2.4 | | | | | |
| Example 307 | | 2.6 | | | | | |
| Example 308 | | 3.3 | | | | | |
| Example 309 | | 6.6 | | | | | |
| Example 310 | SBA-1 | 13.2 | | | | | |
| Example 311 | | 19.8 | | | | | |
| Example 312 | | 26.4 | | | | | |
| Example 313 | MCM-41 | 1.1 | Yes | 1000 | | 11 | 72 |
| Example 314 | | | | 500 | | | |
| Example 315 | | | | 200 | | | |
| Example 316 | | | | 100 | | | |
| Example 317 | | 1.6 | | | | | |
| Example 318 | | 2.0 | | | | | |
| Example 319 | | 2.2 | | | | | |
| Example 320 | | 2.7 | | | | | |
| Example 321 | | 5.4 | | | | | |
| Example 322 | SBA-1 | 10.9 | | | | | |
| Example 323 | | 16.3 | | | | | |
| Example 324 | | 21.8 | | | | | |
| Example 325 | MCM-41 | 1.1 | None | 1000 | | | |
| Example 326 | | | | 500 | | | |
| Example 327 | | | | 200 | | | |
| Example 328 | | | | 100 | | | |
| Example 329 | | 1.6 | | | | | |
| Example 330 | | 2.0 | | | | | |
| Example 331 | | 2.2 | | | | | |
| Example 332 | | 2.7 | | | | | |
| Example 333 | | 5.4 | | | | | |
| Example 334 | SBA-1 | 10.9 | | | | | |
| Example 335 | | 16.3 | | | | | |
| Example 336 | | 21.8 | | | | | |

| | Functional Structural Body | | | | | | |
|---|---|---|---|---|---|---|---|
| | Skeletal body Zeolite-Type Compound | | Functional Substance Metallic Nanoparticles | | | Performance Evaluation | |
| No. | Framework | Average Inner Diameter $D_F$ of Channels (nm) | Type | Average Particle Size $D_C$ (nm) | $D_C/D_F$ | Catalytic Activity | Durability |
| Example 289 | FAU | 0.74 | Cu | 0.11 | 0.1 | C | C |

TABLE 7-continued

| | | | | | | |
|---|---|---|---|---|---|---|
| Example 290 | | 0.74 | 0.32 | 0.4 | C | C |
| Example 291 | | 0.74 | 0.53 | 0.7 | B | C |
| Example 292 | | 0.74 | 1.06 | 1.4 | A | B |
| Example 293 | | 0.74 | 1.59 | 2.1 | A | B |
| Example 294 | | 0.74 | 1.90 | 2.6 | A | A |
| Example 295 | | 0.74 | 2.11 | 2.9 | A | A |
| Example 296 | | 0.74 | 2.64 | 3.6 | A | A |
| Example 297 | | 0.74 | 5.29 | 7.1 | B | A |
| Example 298 | | 0.74 | 10.57 | 14.3 | B | A |
| Example 299 | | 0.74 | 15.86 | 21.4 | C | A |
| Example 300 | | 0.74 | 21.14 | 28.6 | C | A |
| Example 301 | | 0.74 | 0.11 | 0.1 | C | C |
| Example 302 | | 0.74 | 0.32 | 0.4 | C | C |
| Example 303 | | 0.74 | 0.53 | 0.7 | B | C |
| Example 304 | | 0.74 | 1.06 | 1.4 | A | B |
| Example 305 | | 0.74 | 1.59 | 2.1 | A | B |
| Example 306 | | 0.74 | 1.90 | 2.6 | B | A |
| Example 307 | | 0.74 | 2.11 | 2.9 | B | A |
| Example 308 | | 0.74 | 2.64 | 3.6 | B | A |
| Example 309 | | 0.74 | 5.29 | 7.1 | C | A |
| Example 310 | | 0.74 | 10.57 | 14.3 | C | A |
| Example 311 | | 0.74 | 15.86 | 21.4 | C | A |
| Example 312 | | 0.74 | 21.14 | 28.6 | C | A |
| Example 313 | MTW | 0.61 | 0.09 | 0.1 | C | C |
| Example 314 | | 0.61 | 0.26 | 0.4 | C | C |
| Example 315 | | 0.61 | 0.44 | 0.7 | B | C |
| Example 316 | | 0.61 | 0.87 | 1.4 | A | B |
| Example 317 | | 0.61 | 1.31 | 2.1 | A | B |
| Example 318 | | 0.61 | 1.57 | 2.6 | A | B |
| Example 319 | | 0.61 | 1.74 | 2.9 | A | A |
| Example 320 | | 0.61 | 2.18 | 3.6 | A | A |
| Example 321 | | 0.61 | 4.36 | 7.1 | B | A |
| Example 322 | | 0.61 | 8.71 | 14.3 | B | A |
| Example 323 | | 0.61 | 13.07 | 21.4 | C | A |
| Example 324 | | 0.61 | 17.43 | 28.6 | C | A |
| Example 325 | | 0.61 | 0.09 | 0.1 | C | C |
| Example 326 | | 0.61 | 0.26 | 0.4 | C | C |
| Example 327 | | 0.61 | 0.44 | 0.7 | B | C |
| Example 328 | | 0.61 | 0.87 | 1.4 | A | B |
| Example 329 | | 0.61 | 1.31 | 2.1 | A | B |

TABLE 7-continued

| | | | | | |
|---|---|---|---|---|---|
| Example 330 | 0.61 | 1.57 | 2.6 | A | B |
| Example 331 | 0.61 | 1.74 | 2.9 | B | A |
| Example 332 | 0.61 | 2.18 | 3.6 | B | A |
| Example 333 | 0.61 | 4.36 | 7.1 | C | A |
| Example 334 | 0.61 | 8.71 | 14.3 | C | A |
| Example 335 | 0.61 | 13.07 | 21.4 | C | A |
| Example 336 | 0.61 | 17.43 | 28.6 | C | A |

TABLE 8

| | Making Conditions for Functional Structural Body | | | | | |
|---|---|---|---|---|---|---|
| | Precursor Material (A) | | Addition to Precursor Material (A) | | Hydrothermal Treatment Conditions for Precursor Material (C) | | |
| No. | Type | Pore Diameter (nm) | Presence or Absence of Additives | Conversion Ratio (ratio of number of atoms) Si/M of Added Amount of Metal Containing Solution | Type of Structure Directing agent | pH | Time (h) |
|---|---|---|---|---|---|---|---|
| Example 337 | MCM-41 | 1.0 | Yes | 1000 | TPABr | 12 | 72 |
| Example 338 | | 1.0 | | 500 | | | |
| Example 339 | | 1.0 | | 200 | | | |
| Example 340 | | 1.0 | | 100 | | | |
| Example 341 | | 1.5 | | | | | |
| Example 342 | | 1.8 | | | | | |
| Example 343 | | 2.0 | | | | | |
| Example 344 | | 2.5 | | | | | |
| Example 345 | | 5.0 | | | | | |
| Example 346 | SBA-1 | 10.0 | | | | | |
| Example 347 | | 15.0 | | | | | |
| Example 348 | | 20.0 | | | | | |
| Example 349 | MCM-41 | 1.0 | None | 1000 | | | |
| Example 350 | | 1.0 | | 500 | | | |
| Example 351 | | 1.0 | | 200 | | | |
| Example 352 | | 1.0 | | 100 | | | |
| Example 353 | | 1.5 | | | | | |
| Example 354 | | 1.8 | | | | | |
| Example 355 | | 2.0 | | | | | |
| Example 356 | | 2.5 | | | | | |
| Example 357 | | 5.0 | | | | | |
| Example 358 | SBA-1 | 10.0 | | | | | |
| Example 359 | | 15.0 | | | | | |
| Example 360 | | 20.0 | | | | | |

TABLE 8-continued

| No. | | | | | | | |
|---|---|---|---|---|---|---|---|
| Example 361 | MCM-41 | 1.0 | Yes | 1000 | TMABr | 12 | 120 |
| Example 362 | | 1.0 | | 500 | | | |
| Example 363 | | 1.0 | | 200 | | | |
| Example 364 | | 1.0 | | 100 | | | |
| Example 365 | | 1.5 | | | | | |
| Example 366 | | 1.8 | | | | | |
| Example 367 | | 2.0 | | | | | |
| Example 368 | | 2.5 | | | | | |
| Example 369 | | 5.1 | | | | | |
| Example 370 | SBA-1 | 10.2 | | | | | |
| Example 371 | | 15.3 | | | | | |
| Example 372 | | 20.4 | | | | | |
| Example 373 | MCM-41 | 1.0 | None | 1000 | | | |
| Example 374 | | 1.0 | | 500 | | | |
| Example 375 | | 1.0 | | 200 | | | |
| Example 376 | | 1.0 | | 100 | | | |
| Example 377 | | 1.5 | | | | | |
| Example 378 | | 1.8 | | | | | |
| Example 379 | | 2.0 | | | | | |
| Example 380 | | 2.5 | | | | | |
| Example 381 | | 5.1 | | | | | |
| Example 382 | | 10.2 | | | | | |
| Example 383 | SBA-1 | 15.3 | | | | | |
| Example 384 | | 20.4 | | | | | |
| Comparative Example 1 | | | | — | | | |
| Comparative Example 2 | | | | — | | | |

| | Functional Structural Body | | | | | | |
|---|---|---|---|---|---|---|---|
| | Skeletal body Zeolite-Type Compound | | Functional Substance Metallic Nanoparticles | | | | Performance Evaluation |
| No. | Framework | Average Inner Diameter $D_F$ of Channels (nm) | Type | Average Particle Size $D_C$ (nm) | $D_C/D_F$ | Catalytic Activity | Durability |
| Example 337 | MFI | 0.56 | Cu | 0.08 | 0.1 | C | C |
| Example 338 | | 0.56 | | 0.24 | 0.4 | C | C |
| Example 339 | | 0.56 | | 0.40 | 0.7 | B | C |
| Example 340 | | 0.56 | | 0.80 | 1.4 | A | B |
| Example 341 | | 0.56 | | 1.20 | 2.1 | A | B |
| Example 342 | | 0.56 | | 1.44 | 2.6 | A | A |

TABLE 8-continued

| | | | | | | |
|---|---|---|---|---|---|---|
| Example 343 | | 0.56 | 1.60 | 2.9 | A | A |
| Example 344 | | 0.56 | 2.00 | 3.6 | A | A |
| Example 345 | | 0.56 | 4.00 | 7.1 | B | A |
| Example 346 | | 0.56 | 8.00 | 14.3 | B | A |
| Example 347 | | 0.56 | 12.00 | 21.4 | C | A |
| Example 348 | | 0.56 | 16.00 | 28.6 | C | A |
| Example 349 | | 0.56 | 0.08 | 0.1 | C | C |
| Example 350 | | 0.56 | 0.24 | 0.4 | C | C |
| Example 351 | | 0.56 | 0.40 | 0.7 | B | C |
| Example 352 | | 0.56 | 0.80 | 1.4 | A | B |
| Example 353 | | 0.56 | 1.20 | 2.1 | A | B |
| Example 354 | | 0.56 | 1.44 | 2.6 | B | A |
| Example 355 | | 0.56 | 1.60 | 2.9 | B | A |
| Example 356 | | 0.56 | 2.00 | 3.6 | B | A |
| Example 357 | | 0.56 | 4.00 | 7.1 | C | A |
| Example 358 | | 0.56 | 8.00 | 14.3 | C | A |
| Example 359 | | 0.56 | 12.00 | 21.4 | C | A |
| Example 360 | | 0.56 | 16.00 | 28.6 | C | A |
| Example 361 | FER | 0.57 | 0.08 | 0.1 | C | C |
| Example 362 | | 0.57 | 0.24 | 0.4 | C | C |
| Example 363 | | 0.57 | 0.41 | 0.7 | B | C |
| Example 364 | | 0.57 | 0.81 | 1.4 | A | B |
| Example 365 | | 0.57 | 1.22 | 2.1 | A | B |
| Example 366 | | 0.57 | 1.47 | 2.6 | A | B |
| Example 367 | | 0.57 | 1.63 | 2.9 | A | A |
| Example 368 | | 0.57 | 2.04 | 3.6 | A | A |
| Example 369 | | 0.57 | 4.07 | 7.1 | B | A |
| Example 370 | | 0.57 | 8.14 | 14.3 | B | A |
| Example 371 | | 0.57 | 12.21 | 21.4 | C | A |
| Example 372 | | 0.57 | 16.29 | 28.6 | C | A |
| Example 373 | | 0.57 | 0.08 | 0.1 | C | C |
| Example 374 | | 0.57 | 0.24 | 0.4 | C | C |
| Example 375 | | 0.57 | 0.41 | 0.7 | B | C |
| Example 376 | | 0.57 | 0.81 | 1.4 | A | B |
| Example 377 | | 0.57 | 1.22 | 2.1 | A | B |
| Example 378 | | 0.57 | 1.47 | 2.6 | A | B |
| Example 379 | | 0.57 | 1.63 | 2.9 | B | A |
| Example 380 | | 0.57 | 2.04 | 3.6 | B | A |
| Example 381 | | 0.57 | 4.07 | 7.1 | C | A |
| Example 382 | | 0.57 | 8.14 | 14.3 | C | A |

TABLE 8-continued

| | | | | | | | |
|---|---|---|---|---|---|---|---|
| Example 383 | | 0.57 | | 12.21 | 21.4 | C | A |
| Example 384 | | 0.57 | | 16.29 | 28.6 | C | A |
| Comparative Example 1 | MFI Type Silicalite | 0.56 | Co | ≤50 | ≤67.6 | C | D |
| Comparative Example 2 | MFI Type Silicalite | 0.56 | | | | D | D |

As can be seen from Tables 1 to 8, the functional structural bodies (Examples 1 to 384), which were confirmed by cross sectional observation to hold the metallic nanoparticles inside the skeletal bodies, were found to exhibit excellent catalytic activity in the decomposition reaction of butylbenzene and excellent durability as a catalyst compared to the functional structural body in which the metallic nanoparticles were simply adhered to the outer surface of the skeletal body (Comparative Example 1) or the skeletal body having no functional substance (Comparative Example 2).

In addition, the relationship between the amount of metal (mass %) embedded in the skeletal body of the functional structural body measured in the evaluation [C] and the yield (mol %) determined in the evaluation (1) was evaluated. The evaluation method was the same as the evaluation method performed in "(1) catalytic activity" in the [D] "performance evaluation" described above.

As a result, in each example, when the amount of the metal containing solution added to the precursor material (A) was from 50 to 200 in terms of the ratio of number of atoms Si/M (the content of the metal element (M) of the metallic nanoparticles relative to the functional structural body was from 0.5 to 2.5 mass %), the yield of the compound having a molecular weight lower than that of butylbenzene contained in the product liquid was 32 mol % or greater, and the catalytic activity in the decomposition reaction of butylbenzene was particularly excellent.

On the other hand, the silicalite of Comparative Example 1, in which the metallic nanoparticles were attached only to the outer surface of the skeletal body, exhibited improved catalytic activity in the decomposition reaction of butylbenzene compared to the skeletal body having no metallic nanoparticle in Comparative Example 2, but exhibited inferior durability as a catalyst compared to the functional structural bodies in Examples 1 to 384.

In addition, the skeletal body having no functional substance in Comparative Example 2 exhibited little catalytic activity in the decomposition reaction of butylbenzene, and was inferior in both the catalytic activity and the durability to the functional structural bodies in Examples 1 to 384.

What is claimed is:

1. A method for making a functional structural body, comprising:
    a calcination step of calcinating a precursor material (B) obtained by impregnating a precursor material (A) for obtaining a skeletal body of a porous structure composed of a zeolite-type compound with a metal containing solution;
    a hydrothermal treatment step of hydrothermally treating a precursor material (C) obtained by calcinating the precursor material (B) to obtain the functional structural body; and
    a step of subjecting the hydrothermally treated precursor material (C) to a reduction treatment,
    wherein the zeolite-type compound is selected from FAU type, MTW type, MFI type, FER type, LTA type, MWW type, MOR type, LTL type, and BEA type,
    wherein the precursor material (A) is a regular mesopore material, and wherein the regular mesopore material is a compound including a Si—O skeletal body in which pores are uniformly sized and regularly developed one-dimensionally, two-dimensionally, or three-dimensionally.

2. The method for making a functional structural body according to claim 1, wherein 50 to 500 mass % of a non-ionic surfactant is added to the precursor material (A) before adding the metal-containing solution to the precursor material (A).

3. The method for making a functional structural body according to claim 1, wherein the precursor material (A) is impregnated with the metal containing solution by adding the metal containing solution to the precursor material (A) in multiple portions prior to the calcination step.

4. The method for making a functional structural body according to claim 1, wherein an atomic ratio of silicon (Si) constituting the Si—O skeletal body of the precursor material (A) to a metal element (M) of the metal-containing solution ranges from 10 to 1000.

5. The method for making a functional structural body according to claim 1, wherein in the hydrothermal treatment step, the precursor material (C) and a structure directing agent are mixed.

* * * * *